United States Patent
Thalaimalai Vanaraj et al.

(10) Patent No.: US 12,287,708 B2
(45) Date of Patent: Apr. 29, 2025

(54) AUTOMATIC XOR DATA PROGRAMMING BY MEMORY DIE FOR UNCORRECTABLE PAGE FAILURE RECOVERY

(71) Applicant: Western Digital Technologies, Inc., San Jose, CA (US)

(72) Inventors: Anantharaj Thalaimalai Vanaraj, San Jose, CA (US); Sai Gautham Thoppa, San Jose, CA (US); Dharmaraju Marenahally Krishna, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/362,197

(22) Filed: Jul. 31, 2023

(65) Prior Publication Data

US 2024/0419554 A1 Dec. 19, 2024

Related U.S. Application Data

(60) Provisional application No. 63/509,004, filed on Jun. 19, 2023.

(51) Int. Cl.
G06F 11/00 (2006.01)
G06F 11/14 (2006.01)

(52) U.S. Cl.
CPC ...... *G06F 11/1451* (2013.01); *G06F 11/1435* (2013.01); *G06F 11/1458* (2013.01)

(58) Field of Classification Search
CPC ............. G06F 11/1451; G06F 11/1435; G06F 11/1458
See application file for complete search history.

(56) References Cited

U.S. PATENT DOCUMENTS

| | | | |
|---|---|---|---|
| 2011/0219259 A1* | 9/2011 | Frost | G06F 1/30 714/6.2 |
| 2015/0339187 A1* | 11/2015 | Sharon | G06F 11/1068 714/766 |
| 2015/0372697 A1* | 12/2015 | Alhussien | H03M 13/2909 714/755 |
| 2023/0153011 A1* | 5/2023 | Singidi | G06F 3/0652 711/103 |

* cited by examiner

Primary Examiner — Jason B Bryan
(74) Attorney, Agent, or Firm — Sheppard, Mullin, Richter & Hampton LLP

(57) ABSTRACT

Embodiments of the present technology provide non-volatile memory devices comprising memory dies that natively generate "exclusive OR (XOR) data pages" that can be used to recover data pages corrupted by UECC errors. Through memory die native-XOR data page generation, embodiments can recover data pages corrupted by UECC errors more efficiently, more rapidly, and with fewer resources than potential alternative technologies.

20 Claims, 21 Drawing Sheets

| | S0 | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|
| XDL | x | x | x | x | x | x | x | x | x | x | x | x | x | x | x | x |
| ADL | 1 | 0 | 0 | 1 | 1 | 1 | 0 | 0 | 0 | 0 | 0 | 0 | 1 | 1 | 1 | 1 |
| BDL | 1 | 1 | 1 | 0 | 0 | 0 | 0 | 0 | 0 | 1 | 1 | 0 | 0 | 1 | 1 | 1 |
| CDL | 1 | 1 | 1 | 1 | 1 | 0 | 0 | 1 | 1 | 0 | 1 | 1 | 0 | 1 | 0 | 0 |
| TDL | 1 | 1 | 1 | 1 | 1 | 0 | 0 | 0 | 1 | 0 | 0 | 0 | 0 | 0 | 0 | 1 |
| SDL | x | x | x | x | x | x | x | x | x | x | x | x | x | x | x | x |
| SEN | x | x | x | x | x | x | x | x | x | x | x | x | x | x | x | x |

- XDL — XOR Data — Lower Page
- ADL — Fixed Data — Middle Page
- BDL — XOR Data — Upper Page
- CDL — Fixed Data — Top Page

AUTOMATIC XOR DATA PROGRAMMING BY MEMORY DIE FOR UNCORRECTABLE PAGE FAILURE RECOVERY

CROSS REFERENCE TO RELATED APPLICATIONS

This application claims the benefit of and priority to U.S. Provisional Patent Application No. 63/509,004, filed on Jun. 19, 2023, the contents of which are incorporated herein by reference in their entirety.

DESCRIPTION OF RELATED ART

Non-volatile memory devices enable increased portability of data and software applications. A non-volatile memory device may comprise one or more memory dies. A memory die may refer to a set of non-volatile memory cells, and associated circuitry for managing operation of the set of non-volatile memory cells, that are formed on a single/common semi-conductor substrate. The non-volatile memory cells can take the form of solid-state (e.g., flash) memory cells, and can be one-time programmable or multiple-time programmable. For example, a non-volatile memory cell may comprise a transistor that can be programmed to multiple possible states by tuning/programming voltage of the transistor. Non-volatile memory cells of a memory die can be arranged in rows (referred to herein as wordlines).

Non-volatile memory devices can enhance data storage density by storing multiple bits in each non-volatile memory cell of a memory die. For example, such "multi-level" non-volatile memory cells may be programmed to store two bits (e.g., a logic "01"), three bits (e.g., a logic "001"), four bits (e.g., a logic "0001"), etc. As alluded to above, a non-volatile memory cell may comprise a transistor that can be programmed to multiple possible states by tuning/programming voltage of the transistors. For example, a quadruple-level non-volatile memory cell (referred to herein as a QLC) may comprise a transistor that can be programmed to 16 possible states by tuning/programming voltage of the transistor. By contrast, a triple-level non-volatile memory cell (referred to herein as a TLC) may comprise a transistor that can be programmed to 8 possible states by tuning/programming voltage of the transistor. In certain implementations, multi-level non-volatile memory cells can leverage logical "data pages" for storing multiple bit levels. For example, a wordline of QLCs may store: (1) a top data page comprising the most significant bits of data stored by the wordline; (2) an upper data page comprising the second most significant bits of the data; (3) a middle data page comprising the third most significant bits of the data; and (4) a lower data page comprising the least significant bits of the data. It should be understood that in other implementations the above-described bit/page arrangement may be different. For example, the lower data page may comprise the most significant bits of the data, and the top data page may comprise the least significant bits of the data, etc.

Before programming data to non-volatile memory cells, a non-volatile memory device can leverage volatile memory that temporarily stores the data prior to and during non-volatile memory programming. For example, a memory die of a non-volatile memory device may comprise its own set of data latches. A data latch may comprise a circuit (or circuits) of a memory die that temporarily stores data prior to and during non-volatile memory programming. Where a memory die stores multiple bits in each of its constituent non-volatile memory cells, the memory die may include a set of data latches that temporarily store the above-described data pages corresponding to the multiple bit levels. For example, in a QLC memory die (i.e., a memory die comprising wordlines of QLCs) a top page data latch may temporarily store a top data page comprising the most significant bits of data to be stored in a wordline of QLCs, an upper page data latch may temporarily store an upper data page comprising the second most significant bits of the data, a middle page data latch may temporarily store a middle data page comprising the third most significant bits of the data, and a lower page data latch may store a lower data page comprising the least significant bits of the data. As alluded to above, in other implementations the above-described bit/page arrangement may be different.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 10 depicts an example non-volatile memory cell state encoding table, in accordance with embodiments of the present technology.

Figure 1:
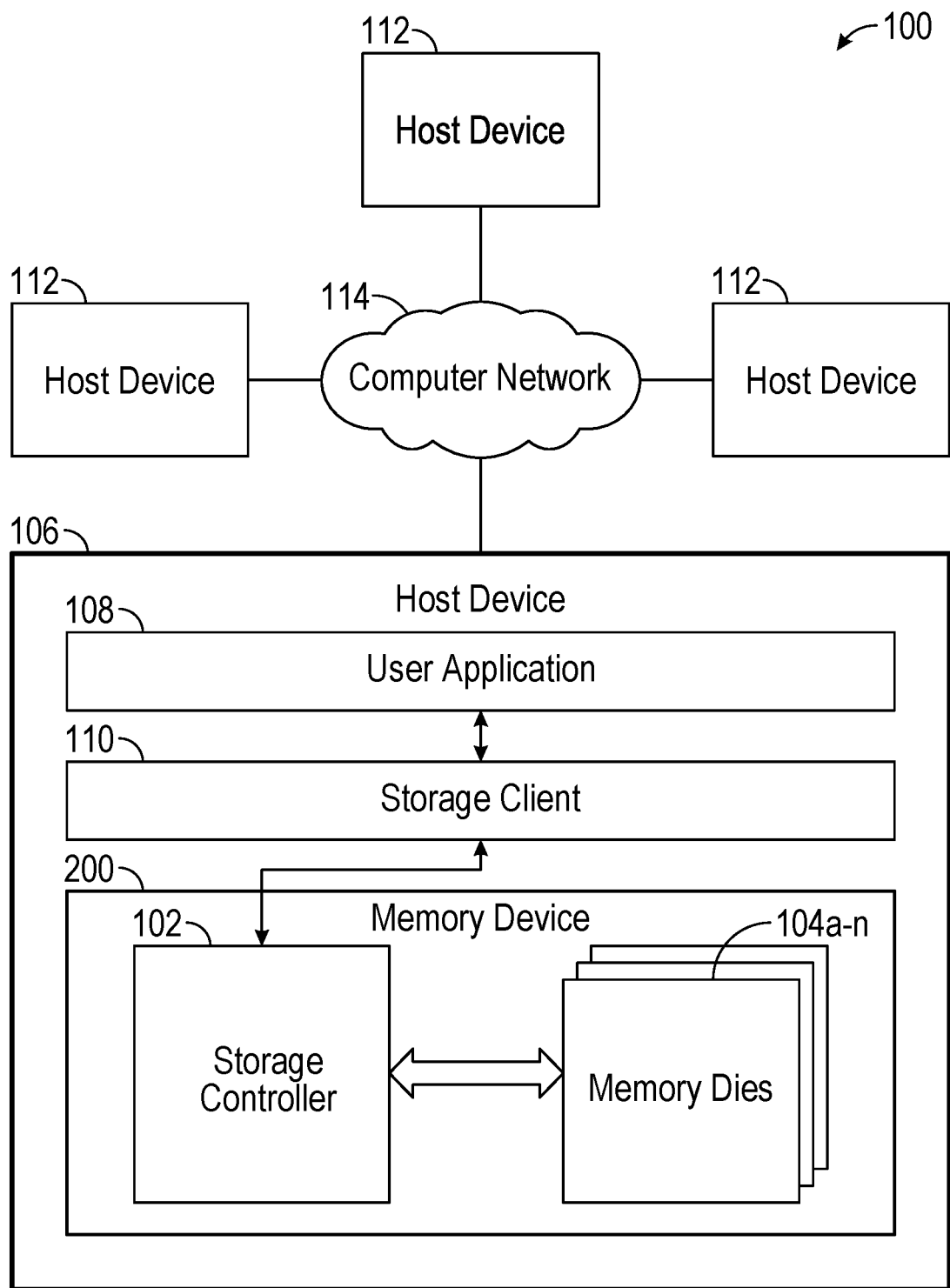
FIG. 1 is a block diagram of an example memory system, in connection with which, example embodiments of the disclosed technology can be implemented.

The figures are not exhaustive and do not limit the present disclosure to the precise form disclosed.

DETAILED DESCRIPTION

Data corruption errors can be a serious problem for non-volatile memory devices as they negatively impact performance/reliability. An error event may occur when data programmed to a non-volatile memory cell is corrupted by programming of adjacent non-volatile memory cells (commonly known as programming disturbance). Other error events may occur when non-volatile memory cell cells are unable to retain the data programmed to them. Where a non-volatile memory device includes multi-level non-volatile memory cells, an error event may be isolated to an individual non-volatile memory cell, multiple (adjacent or non-adjacent) non-volatile memory cells associated with a common data page, multiple (adjacent or non-adjacent) non-volatile memory cells associated with a common wordline, etc.

Error correction coding (ECC) can be used to correct certain data corruption errors for a data page. For example, prior to non-volatile memory programming, data pages may be encoded by an ECC engine to generate redundant information that may be stored with the data pages as ECC codewords. However, such an ECC engine/process has a limited error correction capability. Bit error rates that exceed the error correction capability of the ECC engine/process may be referred to as "uncorrectable" error correction coding (UECC) errors.

Existing techniques for recovering data pages corrupted by UECC errors are generally inefficient, time consuming, and resource intensive. Accordingly, there is a serious need for systems and methods that can recover data pages corrupted by UECC errors more efficiently.

Against this backdrop, embodiments of the present technology provide non-volatile memory devices (and associated methods) comprising memory dies that natively generate "exclusive OR (XOR) data pages" that can be used to recover data pages corrupted by UECC errors. As will be described in greater detail below, through memory die native-XOR data page generation, embodiments can recover data pages corrupted by UECC errors more efficiently, more rapidly, and with fewer resources than potential alternative technologies.

For example, a memory die of the present technology may comprise a controller operative to: (1) generate an XOR data page by performing an XOR operation between a first raw data page and a second raw data page (i.e., data pages received from a host and/or a storage controller of a non-volatile memory device on which the memory die is implemented); (2) generate a fixed content data page (e.g., based on a state encoding scheme utilized for programming non-volatile memory cells of the memory die); (3) store the XOR data page on a first back-up data plane-data latch; and (4) store the fixed content data page on a second back-up data plane-data latch (as described below, the first back-up data plane-data latch and the second back-up data plane-data latch may be implemented on a common back-up data plane). The memory die may further comprise: (1) a raw data plane (e.g., a first physical division of the memory die) comprising (a) a first raw data plane-data latch that stores the first raw data page, and (b) a second raw data plane-data latch that stores the second raw data page; and (2) a back-up data plane (e.g., a second physical division of the memory die) comprising (a) the first back-up data plane-data latch that stores the XOR data page, and (b) the second back-up data plane-data latch that stores the fixed content data page. The controller may be further operative to: (1) program the first and second raw data pages to a wordline of the raw data plane; (2) program the XOR data page and the fixed content data page to a wordline of the back-up data plane; (3) responsive to determining the first raw data page has become corrupted (e.g., by a UECC error), recover the first raw data page by performing an XOR operation between the second raw data page and the XOR data page; and/or (4) responsive to determining the second raw data page has become corrupted, recover the second raw data page by performing an XOR operation between the first raw data page and the XOR data page. In various examples, the above-described programming to the wordlines of the raw data plane and back-up data plane may be performed in parallel (i.e., simultaneously) leveraging an "all-plane" enable mode of the memory die that facilitates parallel/simultaneous data latch operations and programming across data planes.

Individual features of the above-described technology will be described in the following paragraphs.

Corrupted Raw Data Page Recovery Using an XOR Data Page: As embodiments of the present technology are designed in appreciation of, a corrupted first raw data page can be recovered using a data page (i.e., an original XOR data page) comprising results of an XOR operation performed between a previous, non-corrupted version of the first raw data page, and a second raw data page. Namely, an XOR operation performed between the original XOR data page and the second raw data page can be used to recover the corrupted first raw data page. Relatedly, if instead the second raw data page becomes corrupted, an XOR operation performed between the original XOR data page and the (uncorrupted) first raw data page can be used to recover the corrupted second raw data page.

Using a combination of XOR data pages and fixed content data pages for back-up has certain advantages. For example, performing an XOR operation between a first raw data page and a second raw data page can generate a single XOR data page that can be used to back-up both the first and the second raw data pages. Moreover (and as will be described in greater detail below), through intelligent/strategic selection of fixed content data page values, embodiments can reduce the number of possible programming states for non-volatile memory cells of the back-up data plane, which can improve reliability for the back-up data (i.e., the XOR data pages) being stored on the back-up data plane.

Memory Die-Native XOR Data Page Generation: Due to memory die native-XOR data page generation (i.e., the process by which a memory die natively generates an XOR data page from raw data pages), embodiments can generate and program XOR data pages for UECC data page error recovery more rapidly than potential alternative technologies. For example, potential alternative technologies could utilize a storage controller of a non-volatile memory device-external to the non-volatile memory device's constituent memory dies—for XOR data page generation. The potential alternative technologies would then require the storage controller to transmit the XOR data page(s) along with the raw data being backed-up by the XOR data page(s) to individual memory dies. By contrast, embodiments can realize a speed/efficiency advantage because embodiments natively perform XOR data page generation at the individual memory dies, and thus need not transmit XOR data pages from the storage controller to the individual memory dies prior to programming the XOR data pages to non-volatile memory. Saving this transmission time, embodiments can generate and program XOR data pages for UECC data page error recovery more rapidly/efficiently than potential alternative technologies. Relatedly, embodiments may consume less buffer space on the non-volatile memory device storage controller than potential alternative technologies that utilize a non-volatile memory device storage controller for XOR data page generation.

As will be described below, a memory die of the present technology can leverage a few unique features that enable the above-described memory die native-XOR data page generation. For example, as embodiments of the present technology are designed in appreciation of, certain memory dies are already capable of performing logical Boolean operations (including an XOR operation) for other purposes. For example, a memory die of the present technology may already perform XOR operations relating to an internal data latch non-volatile memory cell sensing process. Accordingly, embodiments can leverage this existing—and in the context of UECC data page error recovery, currently unutilized—feature of the memory die to generate XOR data pages. As another example, embodiments can leverage modes of a memory die that enable data page sharing across physical planes of the memory die, and in some cases, across multiple memory dies of a common memory package (described in greater detail below). For example, data page sharing across physical planes of a memory die enables a memory die controller to generate and store an XOR data page on a back-up data plane using raw data pages stored on a (separate) raw data plane of the memory die. Relatedly, data page sharing across memory dies enables a memory die controller of a first memory die to generate and store an XOR data page using raw data pages stored on a second memory die of a common memory package.

Raw Data Planes and Back-Up Data Planes: Embodiments can program raw data pages and back-up data pages (i.e., XOR data pages and fixed content data pages) more efficiently by leveraging separate data planes (i.e., physical and logical divisions of a memory die) for the raw data pages and back-up data pages respectively.

For example, the raw data pages may be stored on a raw data plane of a memory die and the back-up data pages may be stored on a back-up data plane of the memory die. Each data plane of the memory die may comprise its own wordlines, data latches, etc. The naming conventions for the "raw data plane" and "back-up data plane" are merely used for clarity in the text of this application. Accordingly, any data plane in the memory die may store raw data pages or back-up data pages (i.e., XOR data pages and fixed content data pages) based on programming method requirements at various times.

As alluded to above, embodiments can leverage an "all-plane" enable mode that enables data page sharing across physical planes of the memory die. Such data page sharing enables a memory die controller to generate and store an XOR data page on the back-up data plane using raw data pages stored on the raw data plane of the memory die. The "all-plane" enable mode can also facilitate simultaneous/parallel data latch operations and programming of raw data pages and back-up data pages on the raw data plane and back-up data plane respectively. In this way, the raw data pages and back-up data pages can be programmed to non-volatile memory in a more rapid/efficient manner than if the raw data pages and back-up data pages were programmed/stored on the same physical data plane.

Storing the raw data pages and back-up data pages on separate data planes of a memory die can also reduce a likelihood that a data corruption impacting a raw data page also impacts an XOR data page used to back-up the raw data page. This is because certain error events may be associated with a certain physical region of the memory die.

Raw Data Memory Die and Back-Up Data Memory Die: Embodiments can also improve programming efficiency and data storage reliability by storing raw data pages and back-up data pages on separate memory dies of a common memory package (as used herein, a memory package refers to a group of memory dies of a non-volatile memory device that share a common interface).

For example, a non-volatile memory device of the present technology may comprise a "back-up data memory die" and "raw data memory die" that belong to a common memory package. The back-up data memory die may comprise a controller operative to: (1) generate a first XOR data page by performing an XOR operation on a first raw data page and a second raw data page; (2) generate a second XOR data page by performing an XOR operation on a third raw data page and a fourth raw data page; (3) generate a first fixed content data page and a second fixed content data page; and (4) store (a) the first XOR data page on a first back-up data plane-data latch, (b) the first fixed content data page on a second back-up data plane-data latch, (c) the second XOR data page on a third back-up data plane-data latch, and (d) the second fixed content data page on a fourth back-up data plane-data latch. The back-up data memory die may further comprise: (1) a first back-up data plane comprising (a) the first back-up data plane-data latch that stores the first XOR data page, and (b) the second back-up data plane-data latch that stores the first fixed content data page; and (2) a second back-up data plane comprising (a) the third back-up data plane-data latch that stores the second XOR data page, and (b) the fourth back-up data plane-data latch that stores the second fixed content data page. The raw data memory die may comprise: (1) a first raw data plane comprising (a) a first raw data plane-data latch that stores the first raw data page, and (b) a second raw data plane-data latch that stores the second raw data page; and (2) a second raw data plane comprising (a) a third raw data plane-data latch that stores the third raw data page, and (b) a fourth raw data plane-data latch that stores the fourth raw data page. Again, the naming conventions for the "raw data memory die" and "back-up memory die" are merely used for clarity in the text of this application. Accordingly, any memory die in a memory package may store raw data pages or back-up data pages (i.e., XOR data pages and fixed content data pages) based on programming method requirements at various times.

As alluded to above, embodiments can leverage an "all-memory die" enable mode that enables multiple memory dies of a common memory package to access a common interface. This shared interface access enables data page sharing across memory dies of the common memory package. Such data page sharing enables a memory die controller of the back-up data memory die to generate and store an XOR data page using raw data pages stored on the raw data page memory die. The shared interface can also facilitate simultaneous/parallel data latch operations and programming of raw data pages and back-up data pages across multiple memory dies. In this way, the raw data pages and back-up data pages can be programmed to non-volatile memory in a more rapid/efficient manner than if the raw data pages and back-up data pages were programmed/stored on the same physical memory die.

Storing the raw data pages and back-up data pages on separate memory dies can also reduce a likelihood that a data corruption impacting a raw data page also impacts an XOR data page used to back-up the raw data page. Again, this is because certain error events may be associated with a certain physical region of non-volatile memory device.

Fixed Content Data Pages: As alluded to above, generation and programming of fixed content data pages can improve reliability for back-up data storage. For example, a QLC memory die (i.e., a memory die comprising QLC cells and sixteen possible non-volatile memory cell programming states) comprising a raw data plane and a back-up data plane may be configured/optimized to program four data pages on a wordline: i.e., a top data page (e.g., storing the most significant bits of data stored on the wordline), an upper data page (e.g., storing the second most significant bits of data stored on the wordline), a middle data page (e.g., storing the third most significant bits of data stored on the wordline), and a lower data page (e.g., storing the least significant bits of data stored on the wordline). In other words, the QLC memory die may be configured/optimized to program four bits to each non-volatile memory cell of a wordline. As alluded to above, the QLC memory die may back-up a top raw data page and an upper raw data page by performing an XOR operation between the top raw data page and the upper raw data page to generate a first XOR data page. The QLC memory die may then back-up a middle raw data page and a lower raw data page by performing an XOR operation between the middle raw data page and the lower data raw page to generate a second XOR data page. As alluded to above, these XOR operations effectively compress the four raw data pages (storing four bits per non-volatile memory cell) into two XOR data pages (storing two bits per non-volatile memory cell). Accordingly, unless the QLC memory die generates additional data pages, the QLC memory die will only have two data pages to program to a wordline of the back-up data plane. In other words, the QLC memory die will only have two bits to program per non-volatile memory cell of the back-up data plane wordline. Having only two data pages/two bits to program to a wordline of a QLC memory die can reduce programming reliability because the QLC memory die is configured/optimized for four data pages/four-bit programming. Thus, generating and programming two fixed content data pages along with the two XOR data pages can improve reliability for back-up data programming on the QLC memory die.

As alluded to above, embodiments can improve reliability through strategic/intelligent selection of values for the fixed content data pages based on a state encoding scheme utilized for programming non-volatile memory cells of a memory die/non-volatile memory device. For example, by selecting values for fixed content data pages that are either all zeroes or all ones, embodiments can reduce the number of possible states that non-volatile memory cells of a back-up data plane wordline can be programmed to. For example, in a QLC memory die of the present technology, the top data page of a back-up data plane wordline may store a first fixed content data page. The upper data page of the back-up data plane wordline may store a first XOR data page (here the first XOR data page may be generated by performing an XOR operation between a top raw data page and an upper raw data page stored on a raw data plane of the QLC memory die). The middle data page of the back-up data plane wordline may store a second fixed content data page, and the lower data page of the back-up data plane wordline may store a second XOR data page (here the second XOR data page may be generated by performing an XOR operation between a middle raw data page and a lower raw data page stored on the raw data plane of the QLC memory die). By this configuration, the first fixed content data page may comprise the most significant bits of the back-up data stored on the back-up data plane wordline. The first XOR data may comprise the second most significant bits of the data, the second fixed content data page may comprise the third most significant bits of the data, and the second XOR data page may comprise the least significant bits of the data. As alluded to above, a QLC on the back-up data plane wordline may comprise a transistor that can be programmed to 16 possible states by tuning/programming voltage of the transistor. However, by selecting values for the first and second fixed content data pages that are either all zeroes or all ones, embodiments can reduce the number of possible states for QLCs on the back-up data plane wordline to four. This is because the most significant bit values (associated with the first fixed content data page) and the third most significant bit values (associated with the second fixed content data page) are being restricted to all ones, or all zeroes. By reducing the number of possible programming states for the QLCs of the back-up data plane to four, embodiments can utilize wider voltage spacing between programming states (i.e., with 16 possible programming states, finer voltage spacing between programming states is required). By using wider spacing between programming states on the back-up data plane, embodiments can reduce the likelihood of error events on the back-up data plane as many error events are associated with fine/close voltage spacing between adjacent programming states. In this way, embodiments can ensure that the back-up data being stored on the back-up data plane is less likely to be corrupted.

Embodiments of the present technology will be described in greater detail with the following FIGS.

FIGS. 1 to 4H depict an example memory system that can be used to implement the technology disclosed herein. Of course, this is just an example implementation, and the disclosed technology is not limited to implementing the present memory cards in a memory system. FIG. 1 is a schematic block diagram illustrating a memory system 100. The memory system 100 includes a memory device 200 (also referred to herein as a storage device), a host device 106, at least one host device 112, and a computer network 114.

The host device 106 may be a computing device (e.g., laptop, desktop, smartphone, tablet, digital camera, wearable smart device, and so on) that includes one or more processors and readable storage devices (such as, but not limited to, RAM, ROM, flash memory, hard disk drive, solid state memory) that store processor readable code (also referred to herein as instructions or software) for programming storage controller 102 to perform the methods described herein. The host device 106 may also include additional system memory, one or more input/output interfaces, and/or one or more input/output devices in communication with the one or more processors, as well as other components well known in the art.

The memory system 100 includes at least one memory device 200, comprising the storage controller 102 and a plurality of memory dies 104. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

In some embodiments, the memory system 100 may include two or more memory devices. Each memory device 200 may include a plurality of memory dies 104, such as flash memory, nano random access memory ("nano RAM or NRAM"), magneto-resistive RAM ("MRAM"), dynamic RAM ("DRAM"), phase change RAM ("PRAM"), etc. The data memory device 200 may also include other types of non-volatile and/or volatile data storage, such as dynamic RAM ("DRAM"), static RAM ("SRAM"), magnetic data storage, optical data storage, and/or other data storage technologies.

The memory device 200 may be a component within a host device 106 as depicted in FIG. 1, and may be connected using a system bus, such as a peripheral component interconnect express ("PCI-e") bus, a Serial Advanced Technology Attachment ("serial ATA") bus, or the like. In another embodiment, the memory device 200 may be external to the host device 106 and is connected via a wired connection, such as, but not limited to, a universal serial bus ("USB") connection, an Institute of Electrical and Electronics Engineers ("IEEE") 1394 bus ("FireWire"), or the like. In other embodiments, the memory device 200 may be connected to the host device 106 using a peripheral component interconnect ("PCI") express bus using external electrical or optical bus extension or bus networking solution such as Infiniband or PCI Express Advanced Switching ("PCIe-AS"), or the like.

In various embodiments, the memory device 200 may be in the form of a dual-inline memory die ("DIMM"), a daughter card, or a micro-module. In another embodiment, the memory device 200 may be a component within a rack-mounted blade. In another embodiment, the memory device 200 may be contained within a package that is integrated directly onto a higher level assembly (e.g., mother-board, laptop, graphics processor, etc.). In another embodiment, individual components comprising the memory device 200 may be integrated directly onto a higher level assembly without intermediate packaging.

In some embodiments, instead of directly connected to the host device 106 via a wired connection, the data memory device 200 may be connected to the host device 106 over a wireless connection. For example, the data memory device 200 may include a storage area network ("SAN") storage device, a network attached storage ("NAS") device, a network share, or the like. In some embodiments, the memory system 100 may be connected to the host via a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 106 and the data memory device 200.

The memory system 100 includes at least one host device 106 connected to the memory device 200. Multiple host devices may be used and may comprise a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. "Computer" refers to any computing device. Examples of a computer include, but are not limited to, a personal computer, a laptop, a tablet, a desktop, a server, a main frame, a supercomputer, a computing node, a virtual computer, a hand held device, a smart phone, a cell phone, a system on a chip, a single chip computer, and the like. In another embodiment, a host device 106 may be a client and the memory device 200 may operate autonomously to service data requests sent from the host device 106. In this embodiment, the host device 106 and memory device 200 may be connected using a computer network, system bus, DAS or other communication means suitable for connection between a computer and an autonomous memory device 200.

The illustrative example shown in FIG. 1, the memory system 100 includes a user application 108 in communication with a storage client 110 as part of the host device 106. "Application" refers to any software that is executed on a device above a level of the operating system. An application will typically be loaded by the operating system for execution and will make function calls to the operating system for lower-level services. An application often has a user interface, but this is not always the case. Therefore, the term 'application' includes background processes that execute at a higher level than the operating system.

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

In various embodiments, the user application 108 may be a software application operating on or in conjunction with the storage client 110. The storage client 110 manages files and data and utilizes the functions and features of the storage controller 102 and associated memory dies 104. "File" refers to a unitary data structure for storing, retrieving, and communicating data and/or instructions. A file is distinguished from other types of packaging by having associated management metadata utilized by the operating system to identify, characterize, and access the file. Representative examples of storage clients include, but are not limited to, a server, a file system, an operating system, a database management system ("DBMS"), a volume manager, and the like.

The storage client 110 may be in communication with the storage controller 102 within the memory device 200.

In various embodiments, the memory system 100 may include one or more clients connected to one or more host device 112 through one or more computer networks 114. A host device 112 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 114 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 114 may also include a network from the IEEE 802 family of network technologies, such Ethernet, token ring, Wi-Fi, WiMax, and the like.

The computer network 114 may include servers, switches, routers, cabling, radios, and other equipment used to facilitate networking the host device 106 or host devices and host devices 112 or clients. In some embodiments, the memory system 100 may include one or more host devices 112 and host device 106 that communicate as peers over a computer network 114. In other embodiments, the memory system 100 may include multiple memory devices 200 that communicate as peers over a computer network 114. One of skill in the art will recognize other computer networks comprising one or more computer networks and related equipment with single or redundant connection(s) between one or more clients or other computer with one or more memory devices 200 or one or more memory devices 200 connected to one or more host devices. In one embodiment, the memory system 100 may include two or more memory devices 200 connected through the computer network 114 to a host device 112 without a host device 106.

In some embodiments, the storage client 110 communicates with the storage controller 102 through a host device interface comprising an Input/Output (I/O) interface. "Interface" refers to a protocol and associated circuits, circuitry, components, devices, systems, sub-systems, and the like that enable one device, component, or apparatus to interact and/or communicate with another device, component, or apparatus. For example, the memory device 200 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In certain embodiments, the storage media of a memory device is divided into volumes or partitions. Each volume or partition may include a plurality of sectors. A sector of data is typically 512 bytes, corresponding to the size of a sector in magnetic disk drives.

In various embodiments number of sectors form a block (or data block), anywhere from 8 sectors, which is 4 KB, for example, up to 32, 64, 128 or more sectors. Different sized blocks and sectors can also be used. In certain storage systems, such as those interfacing with the Windows® operating systems, the data blocks may be referred to as clusters. In other storage systems, such as those interfacing with UNIX, Linux, or similar operating systems, the data blocks may be referred to simply as blocks. A block or data block or cluster represents a smallest physical amount of storage space on the storage media that is managed by a storage manager, such as a storage controller, storage system, storage unit, storage device, or the like.

In some embodiments, the storage controller 102 may be configured to store data on one or more asymmetric, write-once storage media, such as solid-state storage memory cells within the memory die(s) 104. As used herein, a "write once" storage media refers to storage media that is reinitialized (e.g., erased) each time new data is written or programmed thereon. As used herein, an "asymmetric" storage media refers to a storage media having different latencies for different storage operations. Many types of solid-state storage media (e.g., memory die) are asymmetric; for example, a read operation may be much faster than a write/program operation, and a write/program operation may be much faster than an erase operation (e.g., reading the storage media may be hundreds of times faster than erasing, and tens of times faster than programming the storage media).

Management of a data block by a storage manager may include specifically addressing a particular data block for a read operation, write operation, or maintenance operation. A block storage device may associate n blocks available for user data storage across the storage media with a logical address, numbered from 0 to n. In certain block storage devices, the logical addresses may range from 0 to n per volume or partition. In conventional block storage devices, a logical address, also referred to as a logical block address (LBA), maps directly to a particular data block on physical storage media. In conventional block storage devices, each data block maps to a particular set of physical sectors on the physical storage media.

However, certain storage devices need not directly or necessarily associate logical addresses with particular physical data blocks. These storage devices may emulate a conventional block storage interface to maintain compatibility with a block storage client 110.

In some embodiments, the storage controller 102 may provide a block I/O emulation layer, which serves as a block device interface, or API. In these embodiments, the storage client 110 communicates with the storage device through this block device interface. The block I/O emulation layer may receive commands and logical addresses from the storage client 110 in accordance with this block device interface. As a result, the block I/O emulation layer may provide the storage device compatibility with a block storage client 110.

In some embodiments, a storage client 110 communicates with the storage controller 102 through a host device interface comprising a direct interface. In these embodiments, the memory device 200 directly exchanges information specific to non-volatile storage devices. Memory device 200 using direct interface may store data in the memory die(s) 104 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die(s) 104.

The storage controller 102 may receive a logical address and a command from the storage client 110 and perform the corresponding operation in relation to the memory die(s) 104. The storage controller 102 may support block I/O emulation, a direct interface, or both.

Figure 2A:
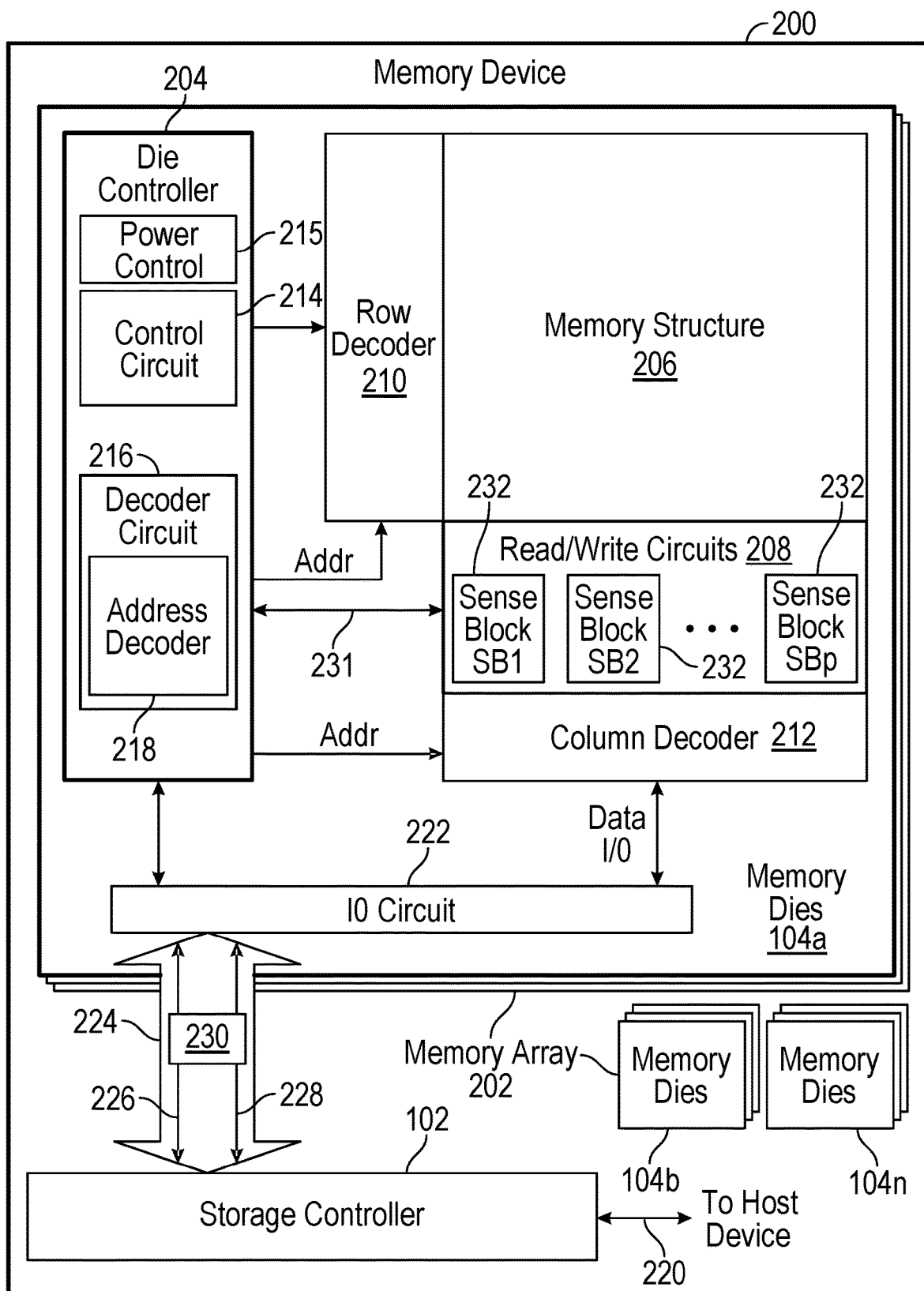
FIG. 2A is a block diagram of an example memory device, in connection with which, example embodiments of the disclosed technology can be implemented.

FIG. 2A is a functional block diagram of an example memory device 200. The components depicted in FIG. 2A are electrical circuits.

The memory device 200 may include a storage controller 102 and a memory array 202 comprised of a number of memory dies 104a-n, the storage controller 102 and memory dies 104a-n being effectively as described with regard to FIG. 1. Each memory die 104a-n can be a complete memory die or a partial memory die and may include a die controller 204, at least one memory structure 206, and read/write circuits 208. The following description will be made with reference to memory die 104a as an example of memory dies 104a-n, where each memory die may include same or similar components and function in the same or similar way. Thus, while reference herein is made to memory die 104a, the same description may be applied equally to memory dies 104b-n.

In this context, "memory array" refers to a set of memory cells (also referred to as storage cells) organized into an array structure having rows and columns. A memory array is addressable using a row identifier and a column identifier, each represented as part of an address, such as a column or row address. A non-volatile memory array is a memory array having memory cells configured such that a characteristic (e.g., threshold voltage level, resistance level, conductivity, etc.) of the memory cell used to represent stored data remains a property of the memory cell without a requirement for using a power source to maintain the characteristic.

Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

In the context of FIG. 2A, memory structure 206 may be addressable by wordlines via a row decoder 210 and by bitlines via a column decoder 212. The read/write circuits 208 include multiple sense blocks 232 including SB1, SB2, . . . , SBp (sensing circuitry) and allow a pages of memory cells to be read or programmed in parallel. Also, many strings of memory cells can be erased in parallel.

"Circuitry", as used herein, refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

A physical page may include memory cells along a row of the memory array for a single plane or for a single memory die. In some embodiments, each memory die 104a-n includes a memory array made up of two equal sized planes. A plane is a division of the memory array that permits certain storage operations to be performed on both places using certain physical row addresses and certain physical column addresses. In one embodiment, a physical page of one plane of a memory die includes four data blocks (e.g., 16 KB). In one embodiment, a physical page (also called a "die page") of a memory die includes two planes each having four data blocks (e.g., 32 KB).

The memory structure 206 can be two-dimensional (2D-laid out in a single fabrication plane) or three-dimensional (3D-laid out in multiple fabrication planes). The non-volatile memory array 202 may comprise one or more arrays of memory cells including a 3D array. In one embodiment, the non-volatile memory array 202 may comprise a monolithic three-dimensional memory structure (3D array) in which multiple memory levels are formed above (and not in) a single substrate, such as a wafer, with no intervening substrates. The non-volatile memory array 202 may comprise any type of non-volatile memory that is monolithically formed in one or more physical levels of arrays of memory cells having an active area disposed above a silicon substrate. The non-volatile memory array 202 may be in a non-volatile solid state drive having circuitry associated with the operation of the memory cells, whether the associated circuitry is above or within the substrate. Word lines may comprise sections of the layers containing memory cells, disposed in layers above the substrate. Multiple word lines may be formed on single layer by means of trenches or other non-conductive isolating features.

The die controller 204 (also referred to as a die control circuitry) cooperates with the read/write circuits 208 to perform memory operations on memory cells of the non-volatile memory array 202 and includes a control circuit 214 (also referred to as a state machine), a decoder circuit 216 that may incorporate an address decoder 218, and a power control circuit 215. The control circuit 214 provides chip-level control of memory operations on the memory die 104a. The die controller 204 may also include power control circuit 215 that controls the power and voltages supplied to the wordlines, bitlines, and select lines during memory operations. The power control circuit 215 may include voltage circuitry, in one embodiment. Power control circuit 215 may include charge pumps for creating voltages. The sense blocks 232 include bitline drivers. The power control circuit 215 executes under control of the control circuit 214, in various embodiments.

"Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components. In one example, the die controller may include buffers such as registers, read-only memory (ROM) fuses and other storage devices for storing default values such as base voltages and other parameters.

"Control circuit" refers to a device, component, element, module, system, sub-system, circuitry, logic, hardware, or circuit configured and/or operational to manage one or more other circuits. For example, a controller programmed by firmware to perform the functions described herein is one example of a control circuit. A control circuit can include a processor, a PGA (Programmable Gate Array), an FPGA (Field Programmable Gate Array), an ASIC (Application Specific Integrated Circuit), or another type of integrated circuit or circuit more generally. In certain embodiments, a control circuit is responsible to ensure that primary features and functionality of a larger circuit, die, or chip, that includes the control circuit, perform properly. The address decoder 218 provides an address interface between that used by the host or a storage controller 102 to the hardware address used by the row decoder 210 and column decoder 212. Power control circuit 215 controls the power and voltages supplied to the wordlines, bitlines, and select lines during memory operations. The power control circuit 215 includes voltage circuitry, in one embodiment. The power control circuit 215 executes under control of the control circuit 214, in one embodiment.

Commands and data are transferred between the host device and storage controller 102 via a data bus 220, and between the storage controller 102 and an input/output (IO) circuit 222 on each of the memory dies 104*a-n* via a memory interface 224. The memory interface 224 may be a type of communication bus, comprising a control bus 226 and a data bus 228 (also referred to herein as I/O data bus), over which fixed length command sequences 230 may be transmitted. The command bus may comprise, for example but not limited to, a command bus over which commands are transmitted to the memory die 104*a* and an address bus over which addresses are transmitted to the memory die 104*a*. "Memory interface" refers to an interface between a memory die and a storage controller. Examples of memory interface that may be used in connection with the disclosed solution include Toggle Mode ("TM"), Toggle NAND 2.0, Open NAND Flash Interface (ONFI) NAND, a vendor specific interface, a proprietary interface, and the like. In the depicted embodiment, the memory interface 224 is a proprietary interface configured to transfer fixed length command sequences 230.

"Communication bus" refers to hardware, software, firmware, logic, control line(s), and one or more associated communication protocols, that are configured to enable a sender to send data to a receiver. A communication bus may include a data bus and/or a control bus.

"Firmware" refers to logic embodied as processor-executable instructions stored on volatile memory media and/or non-volatile memory media.

"Data bus" refers to a communication bus used to exchange one or more of data bits between two electronic circuits, components, chips, die, and/or systems. A data bus may include one or more signal/control lines. A sender, such as a controller, may send data signals over one or more control lines of the data bus in parallel (operating as a parallel bus) or in series (operating as a serial bus). A data bus may include the hardware, control line(s), software, firmware, logic, and/or the communication protocol used to operate the data bus.

Examples data buses may include 8-bit buses having 8 control lines, 16-bit buses having 16 control lines, 32-bit buses having 32 control lines, 64-bit buses having 64 control lines, and the like. Control lines may carry exclusively communication data, exclusively address data, exclusively control data, or any combination of these types of data.

In various embodiments, a single data bus may be shared by a plurality of components, such as memory die. When multiple chips or memory dies share a data bus, that data may be accessed or transferred by a single memory die or by all the memory dies in parallel based on signals on a chip enable control line.

A data bus may operate, and be configured, according to an industry standard or based on a proprietary protocol and design. Multiple control line of a data bus may be used in parallel and may latch data into latches of a destination component according to a clocking signal, data strobe signal ("DQS"), or clock, such as strobe signal. In certain embodiments, a control bus and a data bus together may form a communication bus between a sender and a receiver.

"Control bus" refers to a communication bus used to exchange one or more of data, address information, control signals, clock signals, and the like, between two electronic circuits, components, chips, die, and/or systems. A control bus may comprise 1 or more control lines, be configured to operate as a parallel bus or a serial bus, and may include the hardware, control line(s), software, firmware, logic, and/or the communication protocol used to operate the control bus. Typically, a control bus sends control signals to one or more memory die to manage operations on the memory die.

In certain embodiments, the control bus sends control signals such as, for example, one or more of, a write enable ("WEn"), chip enable ("CEn"), read enable ("REn"), a clock signal, strobe signal ("DQS"), command latch enable ("CLE"), address latch enable ("ALE"), and the like.

In certain embodiments, the control bus may not transfer data relating to a storage operation, such as write data or read data. Instead, write data and read data may be transferred over a data bus. In certain embodiments, a control bus and a data bus together may form a communication bus between a sender and a receiver.

The address decoder 218 of the die controller 204 may be coupled to the memory structure 206 in order to identify a location within the memory structure 206 for a storage command. In particular, the address decoder 218 determines a row identifier and a column identifier which together identifies the location within the memory structure 206 that applies to a storage command associated with a command address. The storage command and command address are received in a fixed length command sequence.

The input/output (IO) circuit 222 may be coupled, through the memory interface 224 and to the memory interface circuit 234 of the storage controller 102, to a data bus 220 in order to receive a fixed length command sequence 230. The decoder circuit 216 of the die controller 204 may be coupled through the input/output (IO) circuit 222 to a control bus 226 to receive fixed length command sequences 230 over the data bus 220 via memory interface circuit 234. In one embodiment, the data bus 220 may comprise eight control lines, each configured to transfer one bit in parallel across the data bus 220.

The decoder circuit 216 may decode a command address and a storage command from a fixed length command sequence. The control circuit 214 of the die controller 204 may be coupled to the input/output (IO) circuit 222 and decoder circuit 216 and may generate control signals 231 to execute storage commands decoded by the decoder circuit 216. "Control signal" refers to an electrical signal (wired or wireless) sent from one device, component, manager, or controller to another device, component, manager, or controller configured to act in response to the control signal.

The read/write circuits 208 may be coupled to the non-volatile memory array 202 and the control circuit 214 in order to transfer data between the non-volatile memory array 202 and the input/output (IO) circuit 222 in response to the storage commands.

In some implementations, some of the components can be combined. In various designs, one or more of the components (alone or in combination), other than memory structure 206, can be thought of as at least one control circuit or storage controller which is configured to perform the techniques described herein. For example, a control circuit may include any one of, or a combination of, storage controller 102, die controller 204, read/write circuits 208, column decoder 212, control circuit 214, decoder circuit 216, address decoder 218, sense blocks SB1, SB2, . . . , SBp, and so forth.

Associated circuitry may be required for operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

In various embodiments, memory structure 206 comprises a three-dimensional (3D) memory array of non-volatile memory cells in which multiple memory levels are formed above a single substrate, such as a wafer. The memory structure may comprise any type of non-volatile memory monolithically formed in one or more physical levels of arrays of memory cells having an active area disposed above a silicon (or other type of) substrate. In one example, the non-volatile memory cells comprise vertical NAND strings with charge-trapping material. In another embodiment, memory structure 206 comprises a two-dimensional (2D) memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 206 is not limited to the examples above. Many different types of memory array architectures or memory technologies can be used to form memory structure 206. No particular non-volatile memory technology is required for purposes of the new claimed embodiments proposed herein. Other examples of suitable technologies for memory cells of the memory structure 206 include resistive random access memory (ReRAM) memories, magnetoresistive RAM (MRAM) memory (e.g., MRAM, Spin Transfer Torque MRAM, Spin Orbit Torque MRAM), phase change memory (PCM), and the like. Examples of suitable technologies for memory cell architectures of the memory structure 206 include 2D arrays, 3D arrays, cross-point arrays, stacked 2D arrays, vertical bitline arrays, and the like.

Cross point memory—one example of a ReRAM or PCM RAM—includes reversible resistance-switching elements arranged in cross point arrays accessed by X lines and Y lines (e.g., wordlines and bitlines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one that is relatively inert (e.g., tungsten) and the other of which is electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

MRAM stores data within magnetic storage elements. The magnetic storage elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device can be built from a grid of such memory cells. In one embodiment for programming, each memory cell lies between a pair of write lines arranged at right angles to each other, parallel to the cell, one above and one below the cell. When current is passed through them, an induced magnetic field is created.

PCM exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). As such, the programming doses are laser pulses. The memory cells can be inhibited by blocking the memory cells from receiving the light. Note that the use of "pulse" in this document does not require a square pulse, but also includes a continuous (or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 2B:
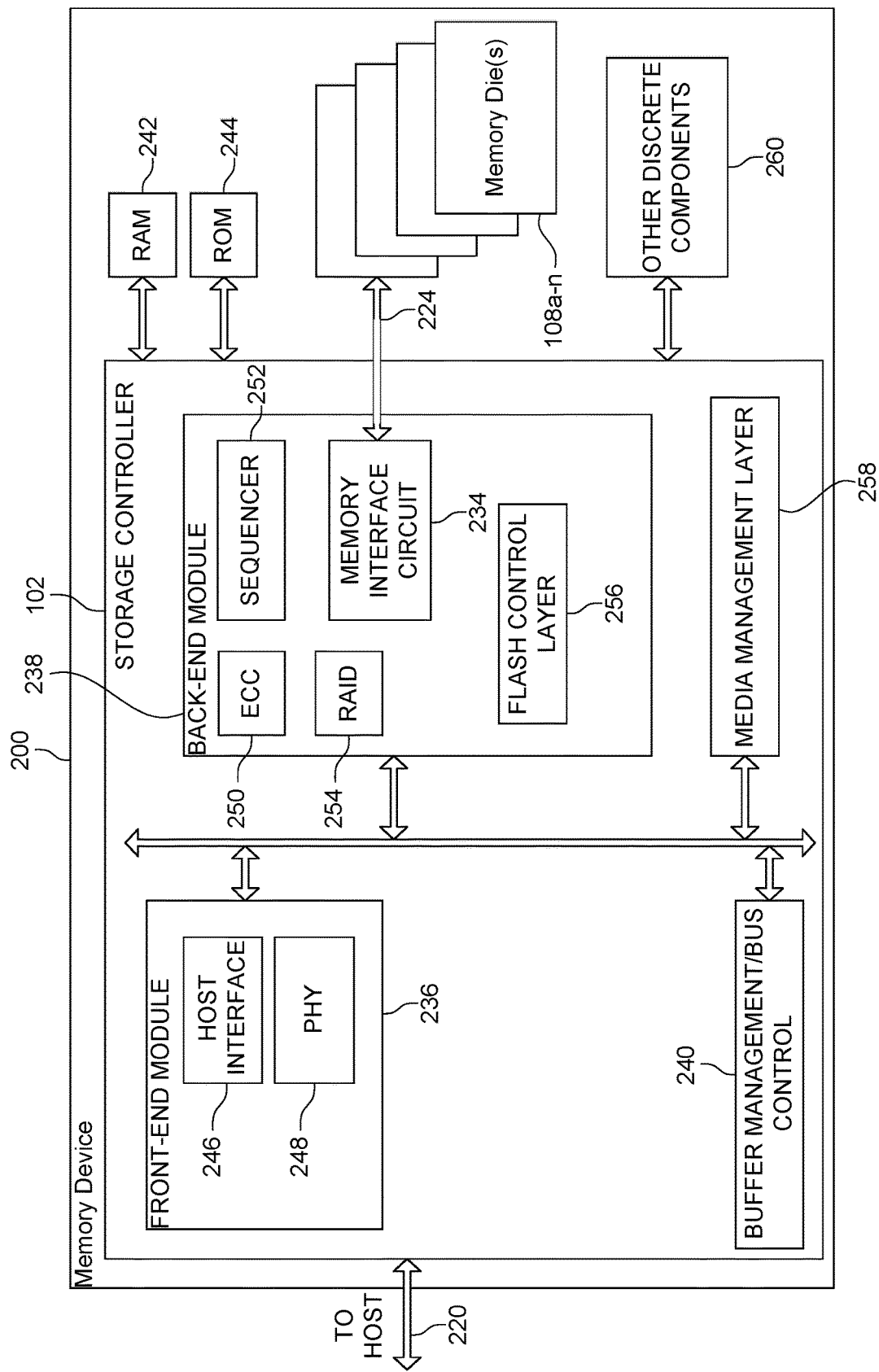
FIG. 2B is a block diagram of an example memory device that depicts more details of an example controller, in connection with which, example embodiments of the disclosed technology can be implemented.

FIG. 2B is a block diagram of example memory device 200 that depicts more details of one embodiment of controller 102. While the storage controller 102 in the embodiment of FIG. 2B is a flash memory controller, it should be appreciated that memory device 200 is not limited to flash memory. Thus, the storage controller 102 is not limited to the particular example of a flash memory controller. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In an example operation, when a host needs to read data from or write data to the flash memory, it will communicate with the flash memory controller. If the host provides a logical address to which data is to be read/written, the flash memory controller can convert the logical address received from the host to a physical address in the flash memory. Alternatively, the host itself can provide the physical address. The flash memory controller can also perform various memory management functions including, but not limited to, wear leveling (distributing writes to avoid wearing out specific blocks of memory that would otherwise be repeatedly written to) and garbage collection (after a block is full, moving only the valid pages of data to a new block, so that the full block can be erased and reused).

The interface between storage controller 102 and memory dies 104 may be any suitable flash interface, such as Toggle Mode 200, 400, or 800. In one embodiment, memory device 200 may be a card-based system, such as a secure digital (SD) or a micro secure digital (micro-SD) card. In an alternate embodiment, memory system 100 may be part of an embedded memory system. For example, the flash memory may be embedded within the host. In other examples, memory device 200 can be a solid state drive (SSD).

In some embodiments, memory device 200 includes a single channel between storage controller 102 and memory die 108. However, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if only a single channel is shown in the drawings.

As depicted in FIG. 2B, storage controller 102 includes a front-end module 236 that interfaces with a host, a back-end module 238 that interfaces with the memory die 108, and various other modules that perform functions which will now be described in detail. The components of storage controller 102 depicted in FIG. 2B may take various forms including, without limitation, a packaged functional hardware unit (e.g., an electrical circuit) designed for use with other components, a portion of a program code (e.g., software or firmware) executable by a (micro) processor or processing circuitry that usually performs a particular function of related functions, a self-contained hardware or software component that interfaces with a larger system, or the like. For example, each module may include an ASIC, an FPGA, a circuit, a digital logic circuit, an analog circuit, a combination of discrete circuits, gates, or any other type of hardware or combination thereof. Alternatively or additionally, each module may include software stored in a processor readable device (e.g., memory) to program a processor to enable storage controller 102 to perform the functions described herein.

Referring again to modules of the storage controller 102, a buffer manager/bus control 240 manages buffers in RAM 242 and controls the internal bus arbitration of storage controller 102. ROM 244 stores system boot code. Although illustrated in FIG. 2B as located separately from the storage controller 102, in other embodiments, one or both of RAM 242 and ROM 244 may be located within the storage controller 102. In yet other embodiments, portions of RAM 242 and ROM 244 may be located within the storage controller 102, while other portions may be located outside the controller. Further, in some implementations, the storage controller 102, RAM 242, and ROM 244 may be located on separate semiconductor dies.

Front-end module 236 includes a host interface 246 and a physical layer interface (PHY) 248 that provide the electrical host interface via bus 220 with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back-end module 238 includes an error correction code (ECC) engine 250 that encodes the data bytes received from the host, and decodes and error corrects the data bytes read from the memory dies 104. A command sequencer 252 generates command sequences, such as program and erase command sequences, to be transmitted to memory dies 104. A RAID (Redundant Array of Independent Dies) module 254 manages generation of RAID parity and recovery of failed data. The RAID parity may be used as an additional level of integrity protection for the data being written into the memory device 200. In some cases, the RAID module 254 may be a part of the ECC engine 250. Note that the RAID parity may be added as one or more extra dies, or may be added within the existing die, e.g., as an extra plane, an extra block, or extra WLs within a block. As described above in connection with FIG. 2A, the memory interface circuit 234 provides command sequences 230 to memory die 104 and receives status information from memory die 104, via memory interface 224. A flash control layer 256 controls the overall operation of back-end module 238.

Additional components of memory device 200 illustrated in FIG. 2B include media management layer (MML) 258, which performs wear leveling of memory cells of memory dies 104, as well as, other discrete components 260, such as external electrical interfaces, external RAM, resistors, capacitors, or other components that may interface with storage controller 102. In alternative embodiments, one or more of the physical layer interface 248, RAID module 254, MML 258, or buffer management/bus controller 240 are optional components.

MML 258 (e.g., Flash Translation Layer (FTL)) may be integrated as part of the flash management for handling flash errors and interfacing with the host. In particular, MML 258 may be a module in flash management and may be responsible for the internals of NAND management. In particular, MML 258 may include an algorithm in the memory device firmware which translates writes from the host into writes to the memory structure 205 of each memory die 104. MML 258 may be needed because: 1) the memory structure 206 may have limited endurance; 2) the memory structure 206 may only be written in multiples of pages; and/or 3) the memory structure 206 may not be written unless it is erased as a block (or a tier within a block in some embodiments). MML 258 understands these potential limitations of the memory structure 206 which may not be visible to the host. Accordingly, MML 258 attempts to translate the writes from host into writes into the memory structure 206.

Storage controller 102 may interface with one or more memory dies 104. In one embodiment, storage controller 102 and multiple memory dies (together comprising non-volatile storage system 100) implement an SSD, which can emulate, replace, or be used in place of a hard disk drive inside a host, as a network access storage (NAS) device, in a laptop, in a tablet, in a server, etc. Additionally, the SSD need not be made to work as a hard drive.

Some embodiments of the memory device 200 may include one memory dies 104 connected to one storage controller 102. Other embodiments may include multiple memory dies 104 in communication with one or more controllers 102. In one example, the multiple memory dies 104 can be grouped into a set of memory packages. Each memory package may include one or more memory dies 104 in communication with storage controller 102. In one embodiment, a memory package includes a printed circuit board (or similar structure) with one or more memory dies 104 mounted thereon. In some embodiments, a memory package can include molding material to encase the memory dies 104 of the memory package. In some embodiments, storage controller 102 is physically separate from any of the memory packages.

Figure 2C:
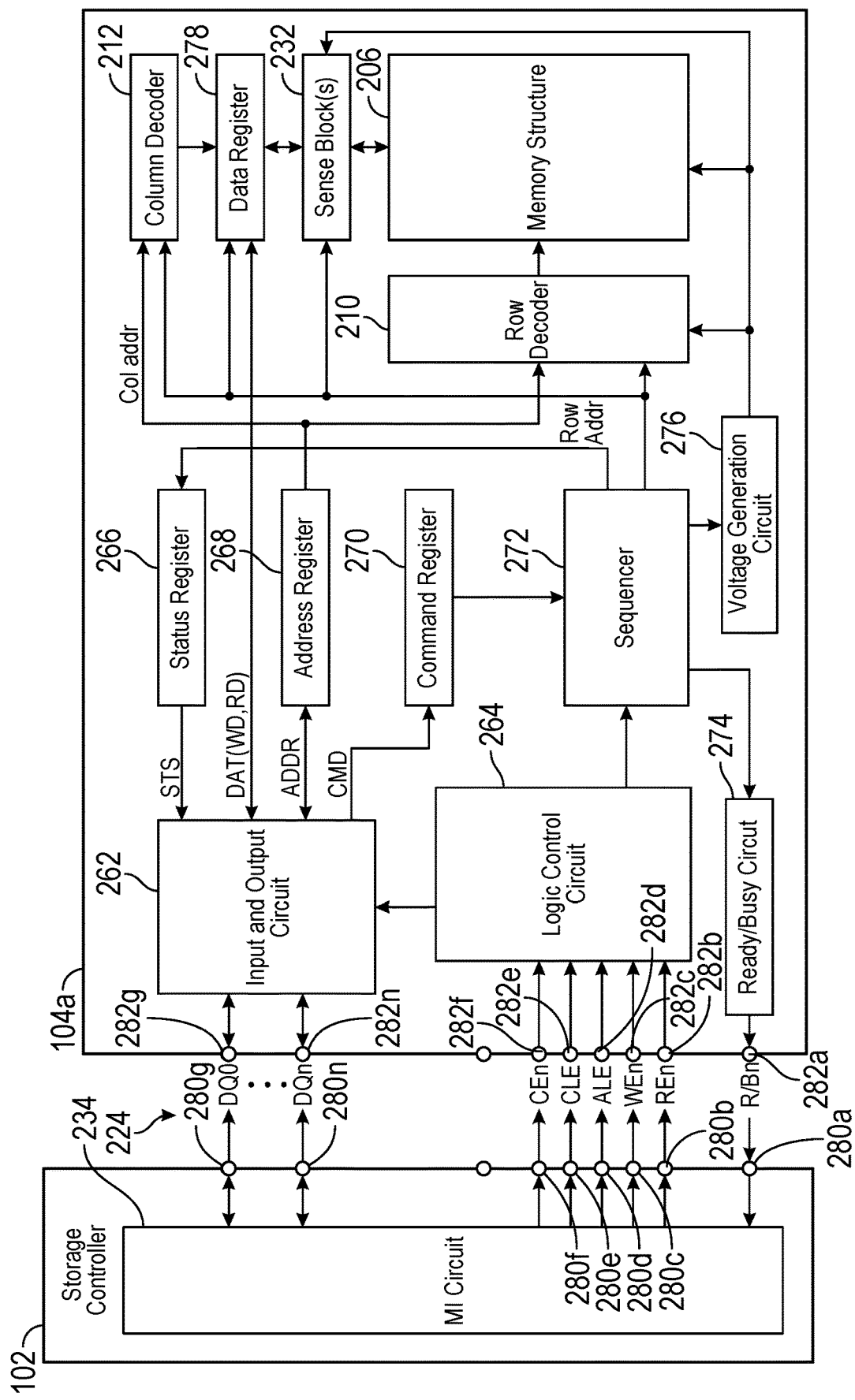
FIG. 2C is a block diagram of example memory system that depicts more details of an example embodiment of memory die, in connection with which, example embodiments of the disclosed technology can be implemented.

FIG. 2C is a block diagram of example memory system 200 that depicts more details of one embodiment of memory die 104a. With reference to FIG. 2B above, the memory die 104a is connected to the storage controller 102 via the memory interface 224 and operates based on commands from the storage controller 102.

For example, the memory die 104a transmits and receives, for example, DQ0 to DQn (hereinafter simply referred to as signals DQ or signals DQ[0:n], where n is an integer of the number of lines) to and from the storage controller 102. The DQ[0:n] signals may be an n-bit wide signal, where each DQ signal is a 1-bit wide signal. In various embodiments, n may be 7, thus DQ[7:0] signals is an 8-bit wide signal. The DQ[0:n] signals may be encoded with input/output (I/O) data, for example, data in (DIN)/data out (DOUT) for data operations (e.g., read operations, write operations, erase operations, etc.) and address data (e.g., address codes) and command data (e.g., command codes) for command/address sequencing of for the data operations. Data sent over the DQ[0:n] signals is latched with respect to a rising edge or a falling edge of a clock signal or data strobe (DQS) signal. In a single data rate ("SDR") mode, the data is latched on either the rising edge or the falling edge of the clock signal. In a double data rate ("DDR") mode (also referred to herein as toggle mode), the data is latched on both the rising and falling edges of the clock signal.

The memory die 104a also receives control signals, such as, but not limited to, CEn signal, CLE signal, ALE signal, WEn signal, REn signal, DQS signal, and the like from the storage controller 102 via the control bus 226 of the memory interface 224. Then, the memory die 104a also transmits control signals, for example but not limited to, a ready/busy signal (R/Bn) to the storage controller 102. In some embodiments, each of control signals may be a one-bit wide signal. In other embodiments, the control signals may have other bit-widths as desired.

The CEn signal is a signal for enabling the memory die 104a. In various embodiments, the CEn signal is an active-low CEn, such that the CEn is asserted at a logic LOW level (e.g., logic level 0 or low voltage (0 volt)) to enable the memory die 104a. A memory array 202 may include a plurality of memory dies 104, each of which may be substantially similar to memory die 104a and activated based on receiving the CEn signal. In some embodiments, memory dies that are not used for a specific task may remain in a standby state. In the standby state, the memory dies do not respond to control signals from the storage controller 102. After asserting the CEn signal, the activated memory die starts responding to the control signals from the storage controller 102. For example, when the storage controller 102 desires to activate memory die 104a, the storage controller 102 asserts the CEn signal at a logic LOW level.

The CLE signal is an active-high signal, according to various embodiments, for enabling command sequencing, for example, by indicating that the DQ[0:n] signal is encoded with a command code (also referred to as CMD) and is asserted, for example, at a logic HIGH level (e.g., logic level 1 or high voltage (e.g., 5 volts)), according to some embodiments. The CLE signal may be used to activate a command bus (e.g., of control bus 226) between the storage controller 102 and the memory die 104a, for example, when the CLE signal is asserted at a logic HIGH level.

The ALE signal is an active-high signal, according to various embodiments, for enabling address sequencing, for example, by indicating that the signal DQ is encoded with an address code (also referred to as ADDR) and is asserted, for example, at the logic HIGH level. The ALE signal may be used to activate an address bus (e.g., of control bus 226) between the storage controller 102 and the memory die 104a, for example, when the ALE signal is asserted at a logic HIGH level.

When the memory die 104a receives the ALE signal that is at a logic LOW level and the CLE signal that is at a logic HIGH level, the memory die 104a knows that the storage controller 102 is sending command data on the DQ[0:n] signals, which is latched into a command register 270. Similarly, when the memory die 104a receives the ALE signal at a logic HIGH level and the CLE signal at a logic LOW level, the memory die 104a knows that address data is being sent by the storage controller 102 and the address data is latched into an address register 268 of the memory die 104a.

The WEn signal is a clock signal for sampling a received signal into the memory die 104a. For example, a signal received by the memory die 104a is sampled and latched at each rising or falling edge of the WEn signal to obtain a bit pattern encoded into the received signal. Accordingly, DQ[0:n] signals are received in the memory die 104a when the WEn signal is toggled. For example, command data and/or address data sent to the memory die 104a may be latched with respect to a rising edge and/or a falling edge of the WEn signal. In various embodiments, WEn signal may be latched in SDR mode or DDR mode.

The REn signal is a signal used for the storage controller 102 to read data from the memory die 104a. For example, data is read out of the memory die 104a at each rising or falling edge of the REn signal. Accordingly, the memory die 104a outputs the DQ[0:n] signals to the storage controller 102 based on the toggled REn signal. The R/Bn signal is a signal indicating whether the memory die 104a is in a busy state or a ready state (in a state in which a command is not receivable or receivable from the storage controller 102) and is considered to be at the logic LOW level, for example, when the memory die 104a is in the busy state.

While the above example provides the CEn signal as an active-low signal and the CLE and ALE signals as active-high signals, other implementations are possible. In some embodiments, the active states may be reversed. For example, the CEn signal may be an active-high signal and the CLE and ALE signals may be active-low signals.

The storage controller 102 issues a command to perform a read operation, a command to perform a write operation, a command to perform an erase, or the like to the memory die 104a in response to a command from a host device (e.g., host device 106 and/or 112). The storage controller 102 manages the memory space of the memory die 104a. As part of the read, write, or erase operations, the memory die 104a issues various commands to perform command/address sequencing for a respective operation and the memory die 104a and/or storage controller 102 transmit DIN/DOUT to complete the respective operation.

As described above, the memory interface circuit 234 of the storage controller 102 connects to the input/output circuit 222 of the memory die 104a via a plurality of electrical contacts. As used herein, electrical contacts may be referred to as pins or pins of a chip for electrically connecting the memory die 104a to the storage controller 102. For example, the storage controller 102 includes a plurality of pins 280a-n electrically connected to a plurality of pins 282a-n of the memory die 104a. The memory interface circuit 234 transmits the CEn signal, CLE signal, ALE signal, and WEn signals to the memory die 104a over the control bus 226 of the memory interface 224 via respective pins and transmits DQ[0:n] signals over the data bus 228 of the memory interface 224 via respective pins. The input/output circuit 222 transmits the R/Bn signal to the storage controller 102 over the control bus 226 and the DQ[0:n] signals over the data bus 228 via respective pins. The pins may also be referred to as receivers or transmitters. For example, where a signal is transmitted from a pin on the storage controller to a pin of the memory die, the transmitting pin may be referred to as an transmitter and the receiving pin may be referred to as a receiver. Each pin may be referred to as either a receiver or output transmitted based on the scenario, for example, one pin may transmit at a first instance while the pin may also receive at a second instance.

As illustrated in FIG. 2C, the memory die 104a includes an input and output circuit 262, a logic control circuit 264, a status register 266, an address register 268, a command register 270, a sequencer 272, a ready/busy circuit 274, a voltage generation circuit 276, and a data register 278. The various components 262-278 may be included as part of the die controller 204, for example, as part of the control circuit 214 and/or decoder circuit 216. FIG. 2C also illustrates the memory structure 206, row decoder 210, a sense blocks 232, and column decoder 212, as described above in connection with FIG. 2B.

The input and output circuit 262 controls input and output of the DQ[0:n] signals to and from the storage controller 102. For example, the input and output circuit 262 transmits data received from the storage controller 102 as DIN to data register 278, transmits an address code to the address register 268, and transmits a command code to the command register 270. DIN, the command code, and the address are transmitted to the memory die 104a as DQ[0:n] signals encoded with a bit pattern for the DIN, command, or address. The input and output circuit 262 also transmits status information STS received from the status register 266, data received from the data register 278 to be transmitted to the storage controller 102 as DOUT. STS and DOUT are transmitted as DQ[0:n] signals encoded with a bit pattern for the STS or DOUT. The input and output circuit 262 and the data register 278 are connected via a data bus. For example, the data bus includes eight I/O data lines 100 to 107 corresponding to the 8-bit signals DQ0 to DQ7. The number of I/O data lines is not limited to eight, but may be set to 16, 32, or any number of data lines.

The logic control circuit 264 receives, for example, the CEn signal, the CLE signal, the ALE signal, the WEn signal, and the REn signal from the storage controller 102 via control bus 226. Then, logic control circuit 264 controls the input and output circuit 262 and the sequencer 272 in accordance with a received signal.

The status register 266 temporarily stores status information STS, for example, in a write operation, a read operation, and an erasing operation for data and notifies the storage controller 102 whether the operation normally ends.

The address register 268 temporarily stores the address code received from the storage controller 102 via the input and output circuit 262. For example, the input and output circuit 262 may detect DQ[0:n] signals and sample the DQ[0:n] signals according to the WEn signal to obtain a bit pattern encoded thereon. The input and output circuit 262 may then decode the bit pattern to obtain the data, which in this case may be an address code. The address code is then temporarily stored in the address register 268. Then, the address register 268 transmits a row address (row addr) to the row decoder 210 and transmits a column address (col addr) to the column decoder 212.

The command register 270 temporarily stores the command code received from the storage controller 102 via the input and output circuit 262 and transmits the command code to the sequencer 272. For example, the input and output circuit 262 may detect DQ[0:n] signals and sample the DQ[0:n] signals according to the WEn signal to obtain a bit pattern encoded thereon. The input and output circuit 262 may then decode the bit pattern to obtain the data, which in this case may be a command code. The command code is then temporarily stored in the command register 270.

The sequencer 272 controls operation of the memory die 104a. For example, the sequencer 272 controls the status register 266, the ready/busy circuit 274, the voltage generation circuit 276, the row decoder 210, the sense blocks 232, the data register 278, the column decoder 212, and the like according to a command code stored in the command register 270 to execute the write operation, the read operation, and the erasing operation according to the code.

The ready/busy circuit 274 transmits the R/Bn signal to the storage controller 102 according to an operation state of the sequencer 272. For example, the R/Bn signal is transmitted to the storage controller 102 via the control bus 226 of the memory interface 224.

The voltage generation circuit 276 generates a voltage necessary for an operation (e.g., a write operation, a read operation, or an erasing operation) according to control of the sequencer 272. The voltage generation circuit 276 may be an example of the power control circuit 215 of FIG. 2A. The voltage generation circuit 276 supplies the generated voltage, for example, to the memory structure 206, the row decoder 210, and the sense blocks 232. The row decoder 210 and the sense blocks 232 apply a voltage supplied from the voltage generation circuit 276 to memory cells in the memory structure 206. Details of the memory structure 206 are provided in connection with FIGS. 3-4G below.

The data register 278 includes a plurality of latch circuits. The latch circuit stores the write data WD and the read data RD. For example, in a write operation, the data register 278 temporarily stores the write data WD received from the input and output circuit 262 and transmits the write data WD to the sense blocks 232. For example, in a read operation, the data register 278 temporarily stores the read data RD received from the sense blocks 232 and transmits the read data RD to the input and output circuit 262.

Figure 3:
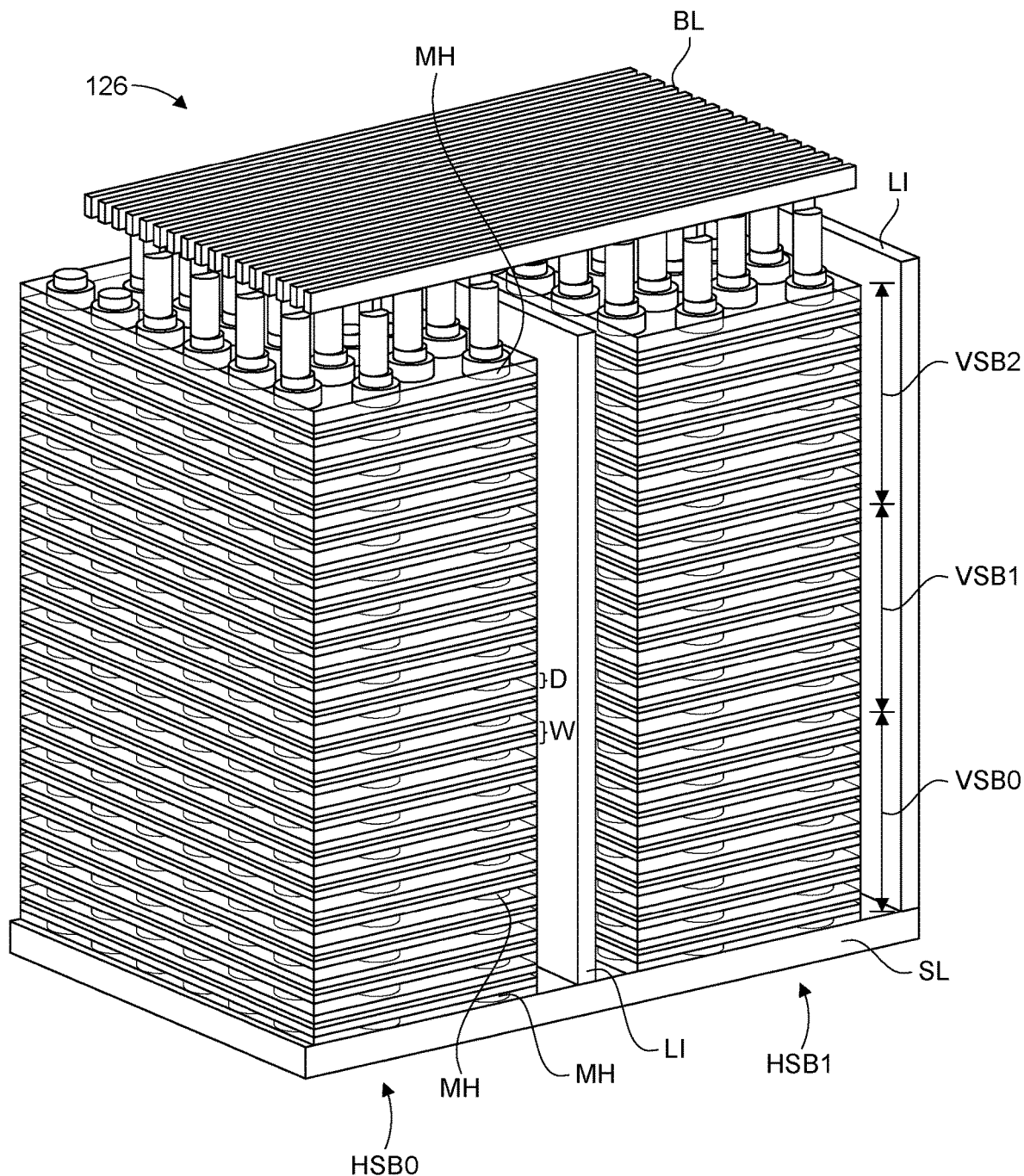
FIG. 3 is a perspective view of a portion of an example monolithic three-dimensional memory structure, in connection with which, example embodiments of the disclosed technology can be implemented.

FIG. 3 is a perspective view of a portion of a monolithic 3D memory array that includes a plurality of non-volatile memory cells, and that can comprise memory structure 206 in one embodiment. FIG. 3 illustrates, for example, a portion of one block of memory. The structure depicted includes a set of bitlines (BLs) positioned above a stack of alternating dielectric layers and conductive layers. For example purposes, one of the dielectric layers is marked as D and one of the conductive layers (also called wordline layers) is marked as W. The number of alternating dielectric and conductive layers can vary based on specific implementation requirements. In some embodiments, the 3D memory array includes between 108-300 alternating dielectric and conductive layers. One example embodiment includes 96 data wordline layers, 8 select layers, 6 dummy wordline layers, and 110 dielectric layers. More or less than 108-300 layers can also be used. Data wordline layers include data memory cells. Dummy wordline layers include dummy memory cells. As will be explained below, the alternating dielectric and conductive layers are divided into four "fingers" by local interconnects LI. FIG. 3 shows two fingers and two local interconnects LI. Below the alternating dielectric layers and wordline layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the 3D monolithic memory array that may comprise memory structure 206 is provided below with respect to FIGS. 4A-4H.

One of the local interconnects LI separates the block into two horizontal sub-blocks HSB0, HSB1. The block comprises multiple vertical sub-blocks VSB0, VSB1, VSB2. The vertical sub-blocks VSB0, VSB1, VSB2 can also be referred to as "tiers." Each vertical sub-block extends across the block, in one embodiment. Each horizontal sub-block HSB0, HSB1 in the block is a part of vertical sub-block VSB0. Likewise, each horizontal sub-block HSB0, HSB1 in the block is a part of vertical sub-block VSB1. Likewise, each horizontal sub-block HSB0, HSB1 in the block is a part of vertical sub-block VSB2. For ease of explanation, vertical sub-block VSB0 will be referred to as a lower vertical sub-block, vertical sub-block VSB1 will be referred to as a middle vertical sub-block, and VSB2 will be referred to as an upper vertical sub-block. In one embodiment, there are two vertical sub-blocks in a block. In other embodiments, there could be four or more vertical sub-blocks in a block.

A memory operation for a vertical sub-block may be performed on memory cells in one or more horizontal sub-blocks. For example, a programming operation of memory cells in vertical sub-block VSB0 may include: programming memory cells in horizontal sub-block HSB0 but not horizontal sub-block HSB1; programming memory cells in horizontal sub-block HSB1 but not horizontal sub-block HSB0; or programming memory cells in both horizontal sub-block HSB0 and horizontal sub-block HSB1.

The different vertical sub-blocks VSB0, VSB1, VSB2 are treated as separate units for erase/program purposes, in one embodiment. For example, the memory cells in one vertical sub-block can be erased while leaving valid data in the other vertical sub-blocks. Then, memory cells in the erased vertical sub-block can be programmed while valid data remains in the other vertical sub-blocks. In some cases, memory cells in the middle vertical sub-block VSB1 are programmed while there is valid data in the lower vertical sub-block VSB0 and/or the upper vertical sub-block VSB2. Programming the memory cells in middle vertical sub-block VSB1 may present challenges due to the valid data in the other vertical sub-blocks VSB0, VSB2.

Figure 4A:
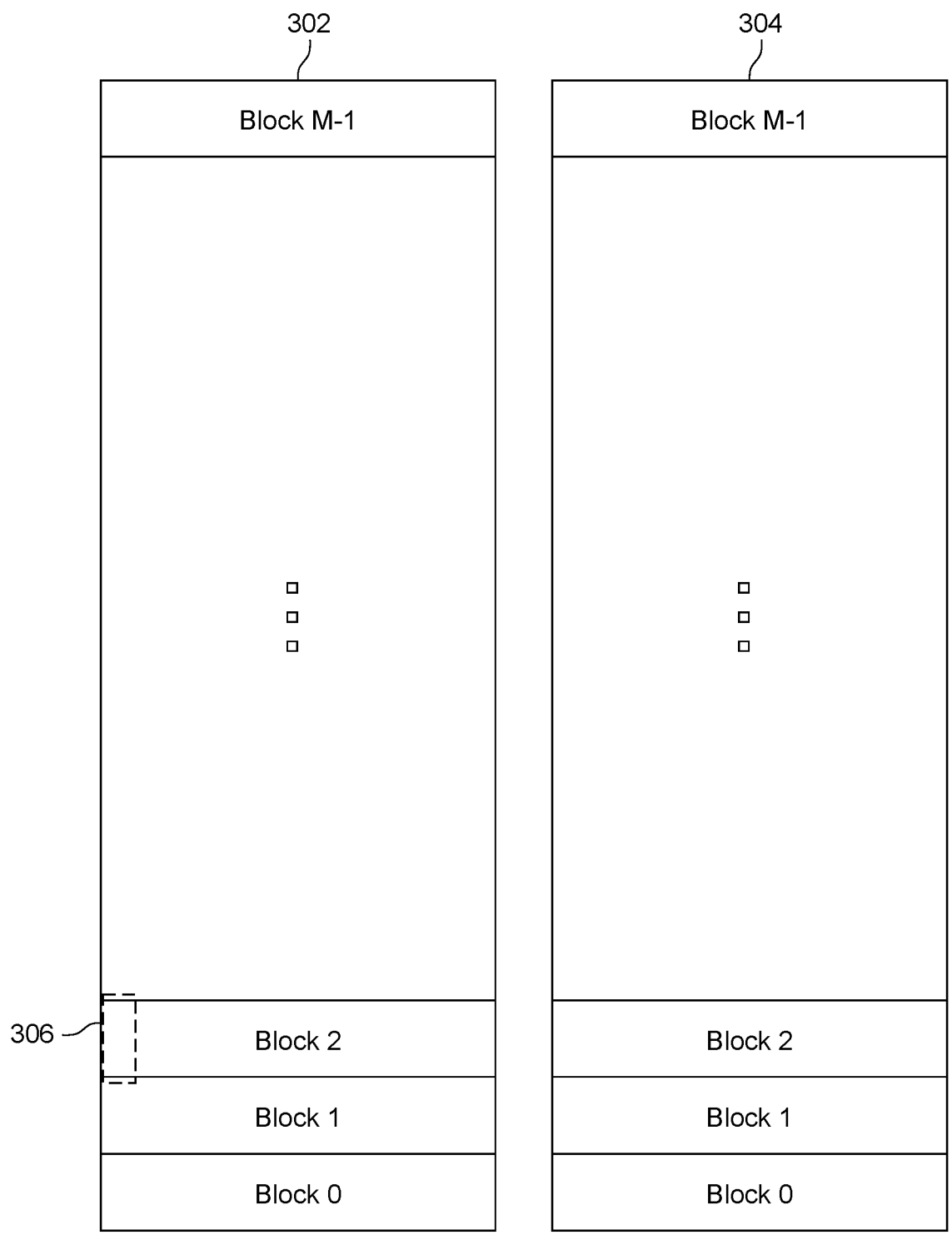
FIG. 4A is a block diagram of an example memory structure having two planes, in connection with which, example embodiments of the disclosed technology can be implemented.

FIG. 4A is a block diagram depicting one example organization of memory structure 206, which is divided into two planes 302 and 304. Each plane is then divided into M blocks. In one example, each plane has about 2000 blocks. However, different numbers of blocks and planes can also be used. In one embodiment, a block of memory cells constitutes a single unit for an erase operation. That is, in one embodiment, all memory cells of a block are erased together. In other embodiments, memory cells can be grouped into blocks for other reasons, such as to organize the memory structure 206 to enable the signaling and selection circuits. In some embodiments, a block represents a groups of connected memory cells that share a common set of wordlines.

Figure 4B:
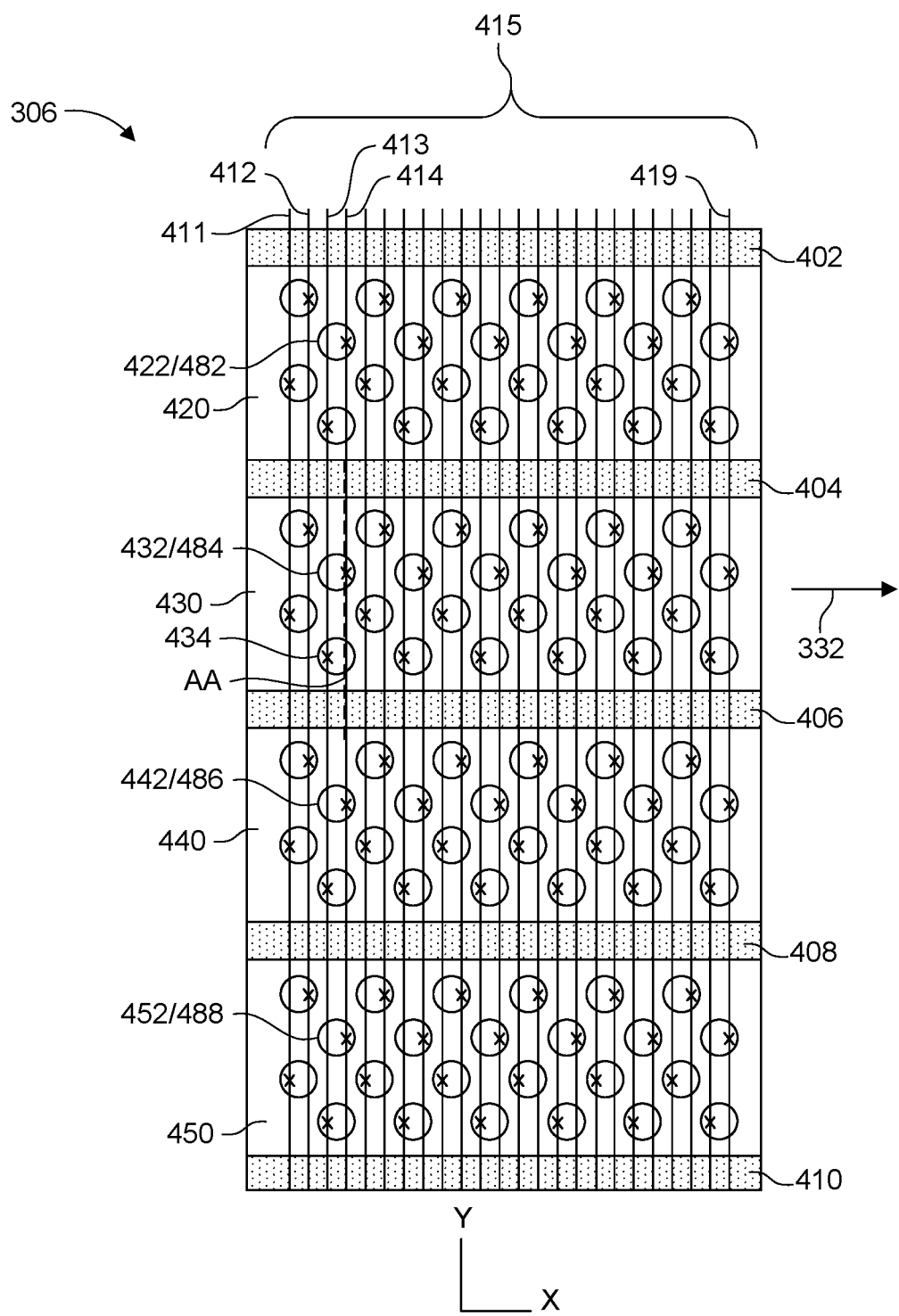
FIG. 4B depicts a top view of a portion of a block of example memory cells, in connection with which, example embodiments of the disclosed technology can be implemented.

FIGS. 4B-4F depict an example 3D NAND structure that corresponds to the structure of FIG. 3 and that can be used to implement memory structure 206 of FIGS. 2A and 2B. Although the example memory system of FIGS. 3-4H is a 3D memory structure that includes vertical NAND strings with charge-trapping material, it should be appreciated that other (2D and 3D) memory structures can also be used with the technology described herein. FIG. 4B is a block diagram depicting a top view of a portion of one block from memory structure 206. The portion of the block depicted in FIG. 4B corresponds to portion 306 in block 2 of FIG. 4A. As can be seen from FIG. 4B, the block depicted in FIG. 4B extends in the direction of 332. While in some embodiments, the memory array may have many layers, FIG. 4B illustrates only the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends in the direction of arrow 332, the block includes more vertical columns than depicted in FIG. 4B.

FIG. 4B also depicts a set of bitlines 415, including bitlines 411, 412, 413, 414, . . . 419. FIG. 4B shows twenty-four bitlines because only a portion of the block is depicted. It is contemplated that more than twenty-four bitlines connected to vertical columns of the block. Each of the circles representing vertical columns has an "x" to indicate its connection to one bitline. For example, bitline 414 is connected to vertical columns 422, 432, 442 and 452.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450, which are referred to as fingers. In the layers of the block that implement memory cells, the four regions are referred to as wordline fingers that are separated by the local interconnects. In one embodiment, the wordline fingers on a common level of a block connect together to form a single wordline. In another embodiment, the wordline fingers on the same level are not connected together. In one example implementation, a bitline only connects to one vertical column in each of regions 420, 430, 440 and 450. In that implementation, each block has sixteen rows of active columns and each bitline connects to four rows in each block. In one embodiment, all of the four rows connected to a common bitline are connected to the same wordline (via different wordline fingers on the same level that are connected together), in which case, the system uses the source side selection lines and the drain side selection lines to choose one (or another subset) of the four to be subjected to a memory operation (program, verify, read, and/or erase).

Although FIG. 4B shows four regions and sixteen rows of vertical columns in a block, with each region having four rows of vertical columns, those exact numbers are an example implementation. Other embodiments may include more or less regions per block, more or less rows of vertical columns per region, and/or more or less rows of vertical columns per block. FIG. 4B also shows the vertical columns being staggered. In other embodiments, different patterns of staggering can be used. In some embodiments, the vertical columns may not be staggered.

Figure 4C:
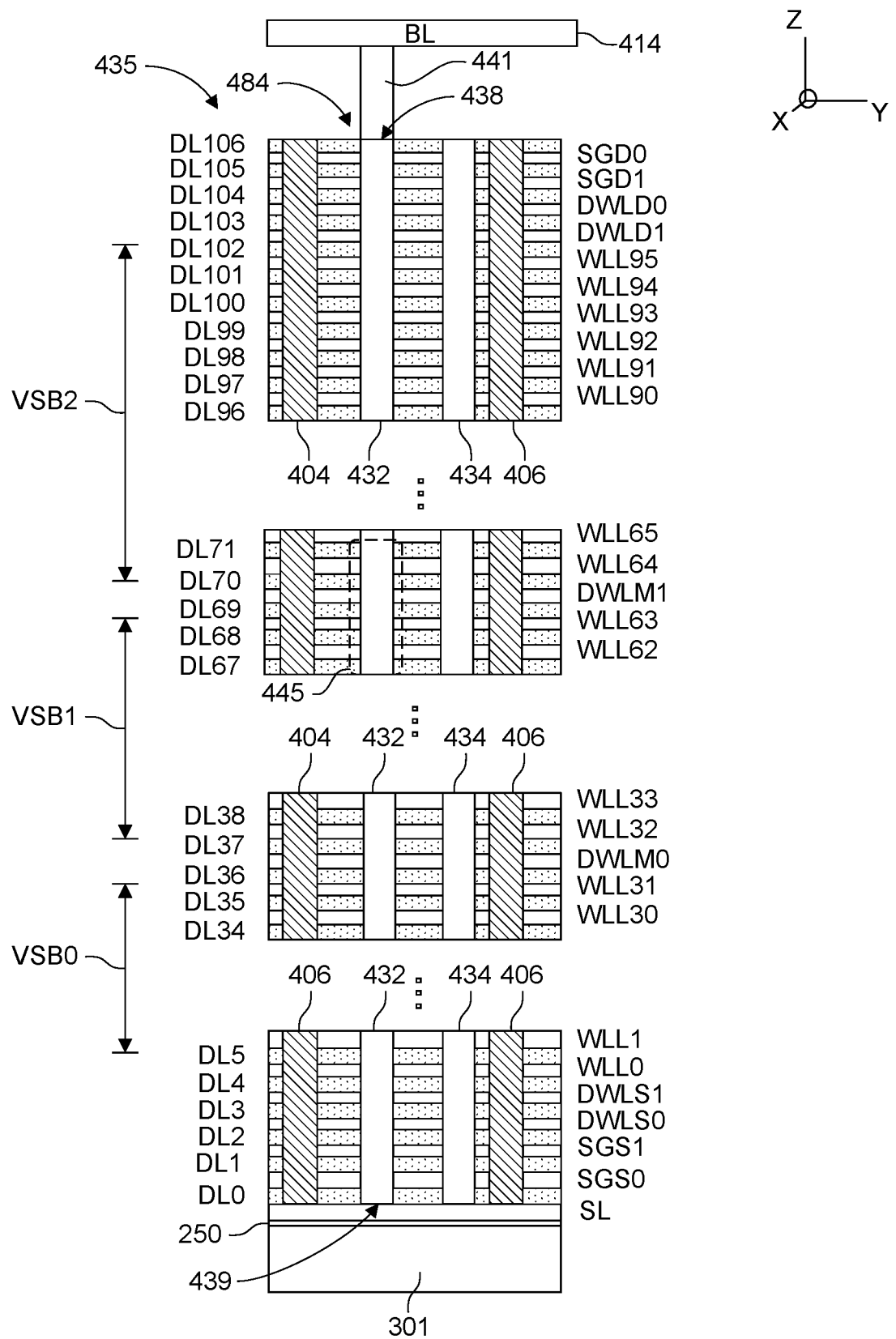
FIG. 4C depicts a stack showing a cross-sectional view along line AA of FIG. 4B.

FIG. 4C depicts an embodiment of a stack 435 showing a cross-sectional view along line AA of FIG. 4B. Two SGD layers (SGD0, SDG1), two SGS layers (SGS0, SGS1) and six dummy wordline layers DWLD0, DWLD1, DWLM1, DWLM0, DWLS0 and DWLS1 are provided, in addition to the data wordline layers WLL0-WLL95. Each NAND string has a drain side select transistor at the SGD0 layer and a drain side select transistor at the SGD1 layer. In operation, the same voltage may be applied to each layer (SGD0, SGD1), such that the control terminal of each transistor receives the same voltage. Each NAND string has a source side select transistor at the SGS0 layer and a drain side select transistor at the SGS1 layer. In operation, the same voltage may be applied to each layer (SGS0, SGS1), such that the control terminal of each transistor receives the same voltage. Also depicted are dielectric layers DL0-DL106.

Columns 432, 434 of memory cells are depicted in the multi-layer stack. The stack includes a substrate 301, an insulating film 250 on the substrate, and a portion of a source line SL. A portion of the bitline 414 is also depicted. Note that NAND string 484 is connected to the bitline 414. NAND string 484 has a source-end 439 at a bottom of the stack and a drain-end 438 at a top of the stack. The source-end 439 is connected to the source line SL. A conductive via 441 connects the drain-end 438 of NAND string 484 to the bitline 414. The metal-filled slits 404 and 406 from FIG. 4B are also depicted.

The stack 435 is divided into three vertical sub-blocks (VSB0, VSB1, VSB2). Vertical sub-block VSB0 includes WLL0-WLL31. Layers SGS0, SGS1, DWLS0, DWLS1 could also be considered to be a part of vertical sub-block VSB0. Vertical sub-block VSB1 includes WLL32-WLL63. Layers SGD0, SGD1, DWLD0, DWLD1 could also be considered to be a part of vertical sub-block VSB2. Vertical sub-block VSB2 includes WLL64-WLL95. Each NAND string has a set of data memory cells in each of the vertical sub-blocks. Dummy wordline layer DMLM0 is between vertical sub-block VSB0 and vertical sub-block VSB1. Dummy wordline layer DMLM1 is between vertical sub-block VSB1 and vertical sub-block VSB2. The dummy wordline layers have dummy memory cell transistors that may be used to electrically isolate a first set of memory cell transistors within the memory string (e.g., corresponding to vertical sub-block VSB0 wordlines WLL0-WLL31) from a second set of memory cell transistors within the memory string (e.g., corresponding to the vertical sub-block VSB1 wordlines WLL32-WLL63) during a memory operation (e.g., an erase operation or a programming operation).

In another embodiment, one or more middle junction transistor layers are used to divide the stack 435 into vertical sub-blocks. A middle junction transistor layer contains junction transistors, which do not necessarily contain a charge storage region. Hence, a junction transistor is typically not considered to be a dummy memory cell. Both a junction transistor and a dummy memory cell may be referred to herein as a "non-data transistor." A non-data transistor, as the term is used herein, is a transistor on a NAND string, where the transistor is either configured to not store user or system data or operated in such a way that the transistor is not used to store user data or system data. A wordline that is connected to non-data transistors is referred to herein as a non-data wordline. Examples of non-data wordlines include, but are not limited to, dummy wordlines, a select line in a middle junction transistor layer, or the like.

The stack 435 may have more than three vertical sub-blocks. For example, the stack 435 may be divided into four, five, or more vertical sub-blocks. Each of the vertical sub-blocks may contain at least one data memory cell. In some embodiments, additional layers similar to the middle dummy wordline layers DWLM may be provided to divide the stack 435 into the additional vertical sub-blocks. In one embodiment, the stack has two vertical sub-blocks.

Figure 4D:
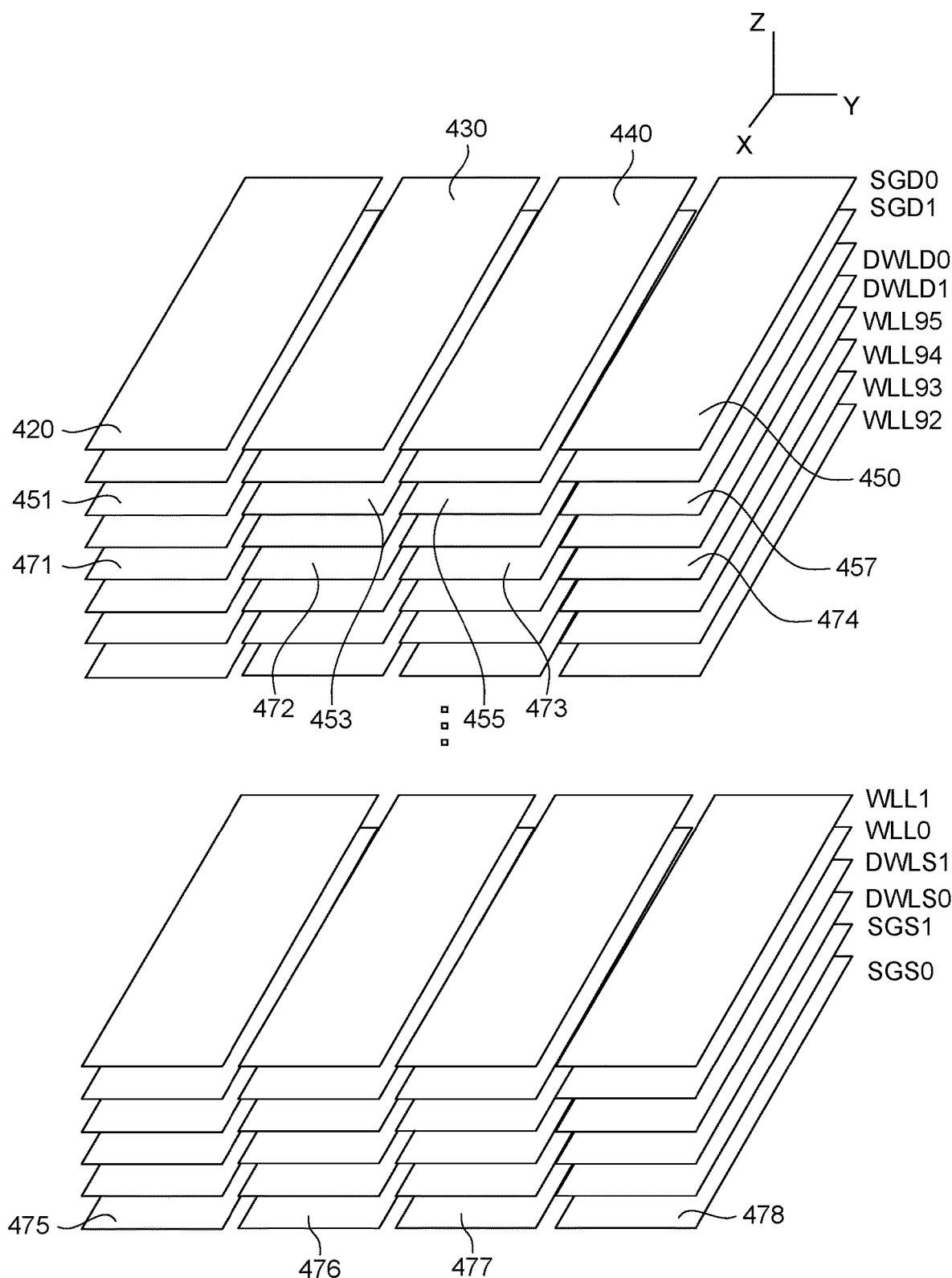
FIG. 4D depicts an alternative view of the select gate layers and wordline layers of the stack of FIG. 4C.

FIG. 4D depicts an alternative view of the SG layers and wordline layers of the stack 435 of FIG. 4C. Each of SGD layers SGD0 and SGD0 (the drain side SG layers) includes parallel rows of SG lines associated with the drain side of a set of NAND strings. For example, SGD0 includes drain side SG regions 420, 430, 440 and 450, consistent with FIG. 4B. Below the SGD layers are the drain side dummy wordline layers. In one implementation, each dummy wordline layer represents a wordline that is connected to a set of dummy memory cells at a given height in the stack. For example, DWLD0 includes wordline layer regions 451, 453, 455 and 457. A dummy memory cell, also referred to herein as a non-data memory cell, does not store data and is ineligible to store data, while a data memory cell is eligible to store data. Moreover, the threshold voltage Vth of a dummy memory cell is generally fixed at the time of manufacture or may be periodically adjusted, while the Vth of the data memory cells changes more frequently, e.g., during erase and programming operations of the data memory cells.

Below the dummy wordline layers are the data wordline layers. For example, WLL95 comprises wordline layer regions 471, 472, 473 and 474. Below the data wordline layers are the source side dummy wordline layers. Below the source side dummy wordline layers are the SGS layers. Each of the SGS layers SGS0 and SGS1 (the source side SG layers) includes parallel rows of SG lines associated with the source side of a set of NAND strings. For example, SGS0 includes source side SG lines 475, 476, 477 and 478. In some embodiments, each SG line is independently controlled, while in other embodiments, the SG lines are connected and commonly controlled.

Figure 4E:
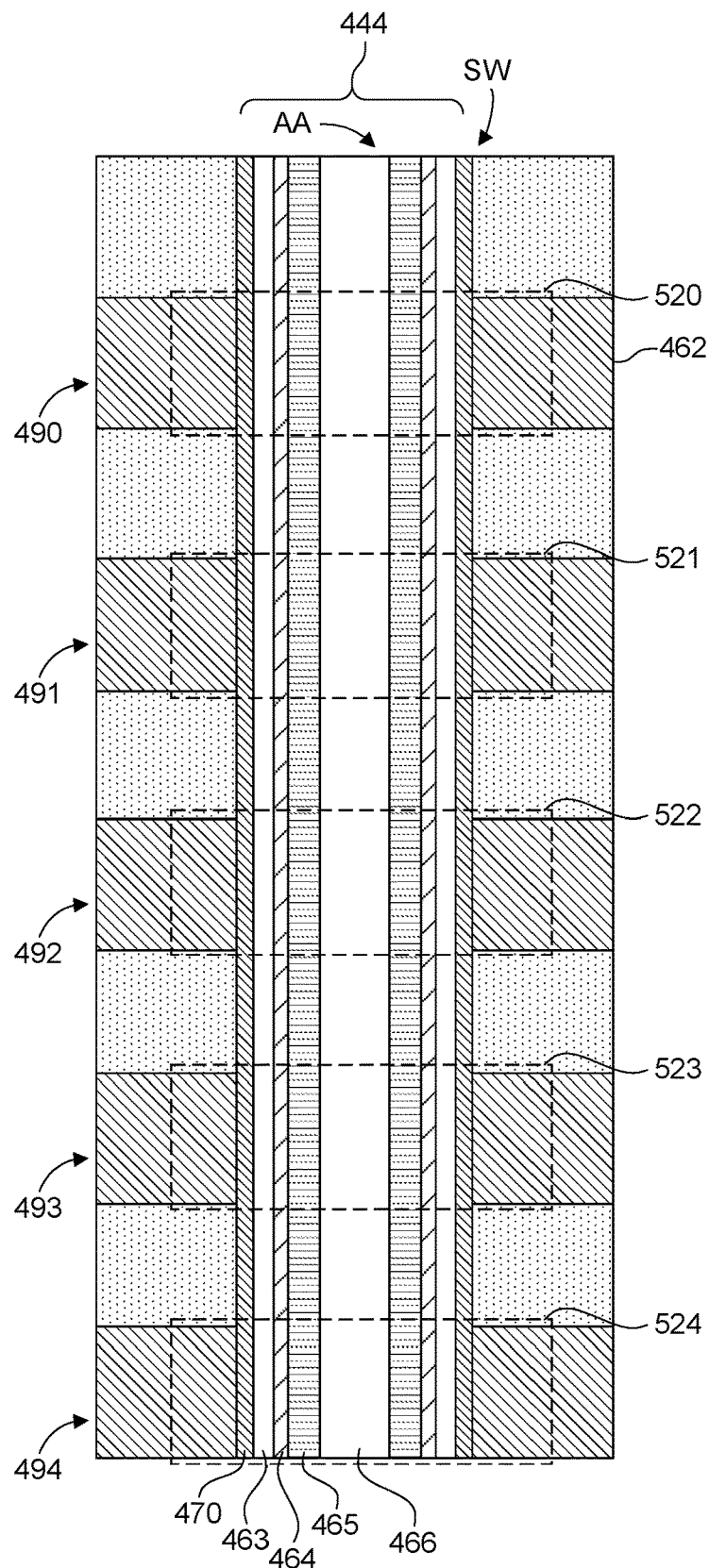
FIG. 4E depicts a view of a region of FIG. 4C.

FIG. 4E depicts a view of the region 445 of FIG. 4C. Data memory cell transistors 520 and 521 are above dummy memory cell transistor 522. Below dummy memory cell transistor 522 are data memory cell transistors 523 and 524. A number of layers can be deposited along the sidewall (SW) of the memory hole 444 and/or within each wordline layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A wordline layer can include a conductive metal 462 such as tungsten as a control gate. For example, control gates 490, 491, 492, 493 and 494 are provided. In this example, all of the layers except the metal are provided in the memory hole. In other approaches, some of the layers may be in the control gate layer. Additional pillars can be similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Non-data transistors (e.g., select transistors, dummy memory cell transistors) may also include the charge trapping layer 463. For example, in FIG. 4E, dummy memory cell transistor 522 includes the charge trapping layer 463. Thus, the Vth of at least some non-data transistors may also be adjusted by storing or removing electrons from the charge trapping layer 463. However, it is not required that all non-data transistors have an adjustable Vth. For example, the charge trapping layer 463 is not required to be present in every select transistor.

Each of the memory holes can be filled with a plurality of annular layers comprising a blocking oxide layer, a charge trapping layer, a tunneling layer, and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4F:
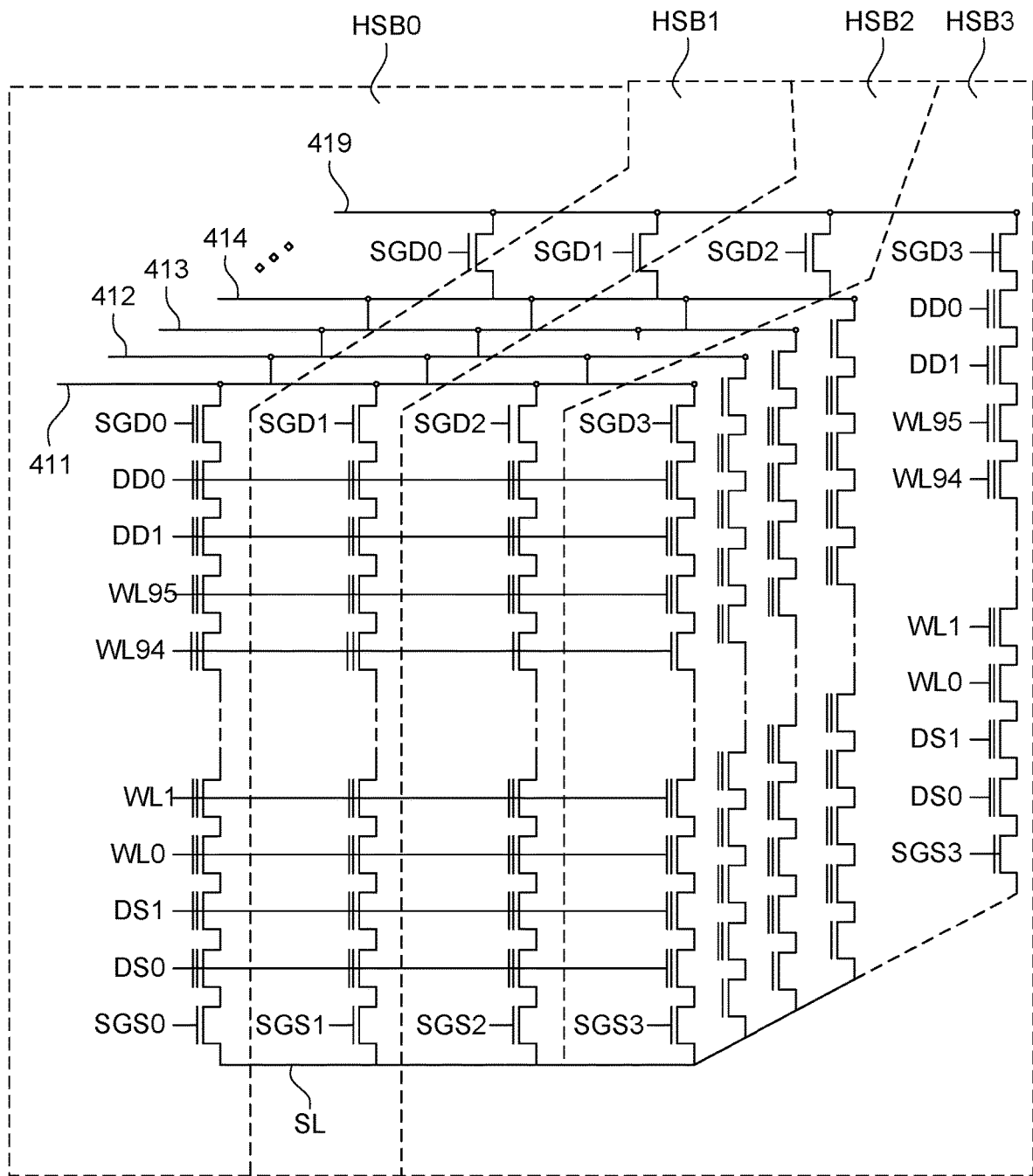
FIG. 4F is a schematic of a plurality of example NAND strings showing multiple horizontal sub-blocks, in connection with which, example embodiments of the disclosed technology can be implemented.

FIG. 4F is a schematic diagram of a portion of the memory depicted in FIGS. 3-4E. FIG. 4F shows physical wordlines WLL0-WLL95 running across the entire block. The structure of FIG. 4F corresponds to portion 306 in Block 2 of FIGS. 4A-E, including bitlines 411, 412, 413, 414, . . . 419. Within the block, each bitline is connected to four NAND strings. Drain side selection lines SGD0, SGD1, SGD2 and SGD3 are used to determine which of the four NAND strings connect to the associated bitline(s). Source side selection lines SGS0, SGS1, SGS2 and SGS3 are used to determine which of the four NAND strings connect to the common source line. The block can also be thought of as divided into four horizontal sub-blocks HSB0, HSB1, HSB2 and HSB3. Horizontal sub-block HSB0 corresponds to those vertical NAND strings controlled by SGD0 and SGS0, horizontal sub-block HSB1 corresponds to those vertical NAND strings controlled by SGD1 and SGS1, horizontal sub-block HSB2 corresponds to those vertical NAND strings controlled by SGD2 and SGS2, and horizontal sub-block HSB3 corresponds to those vertical NAND strings controlled by SGD3 and SGS3.

Figure 4G:
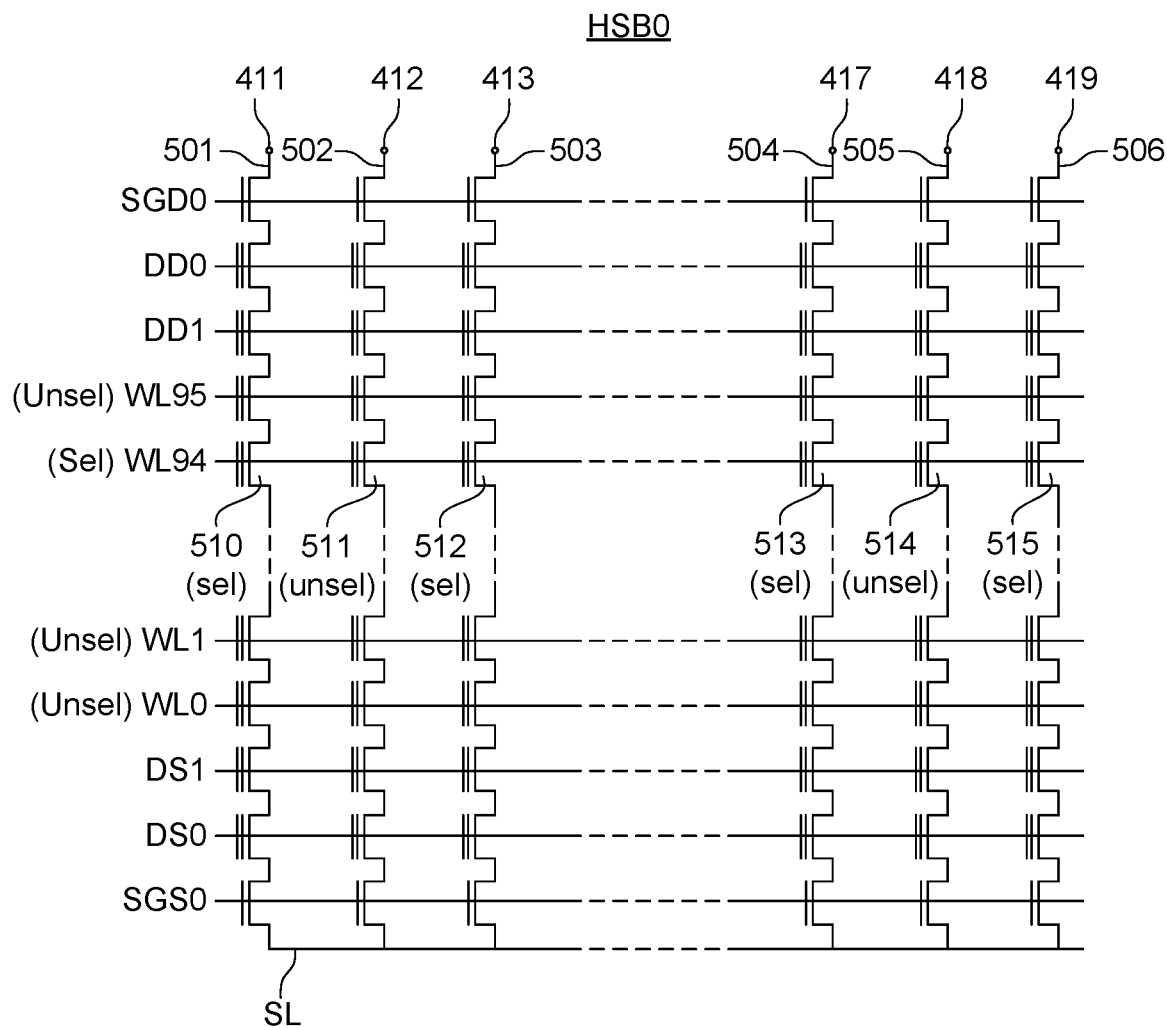
FIG. 4G is a schematic of a plurality of NAND strings showing one example horizontal sub-block, in connection with which, example embodiments of the disclosed technology can be implemented.
Figure 4H:
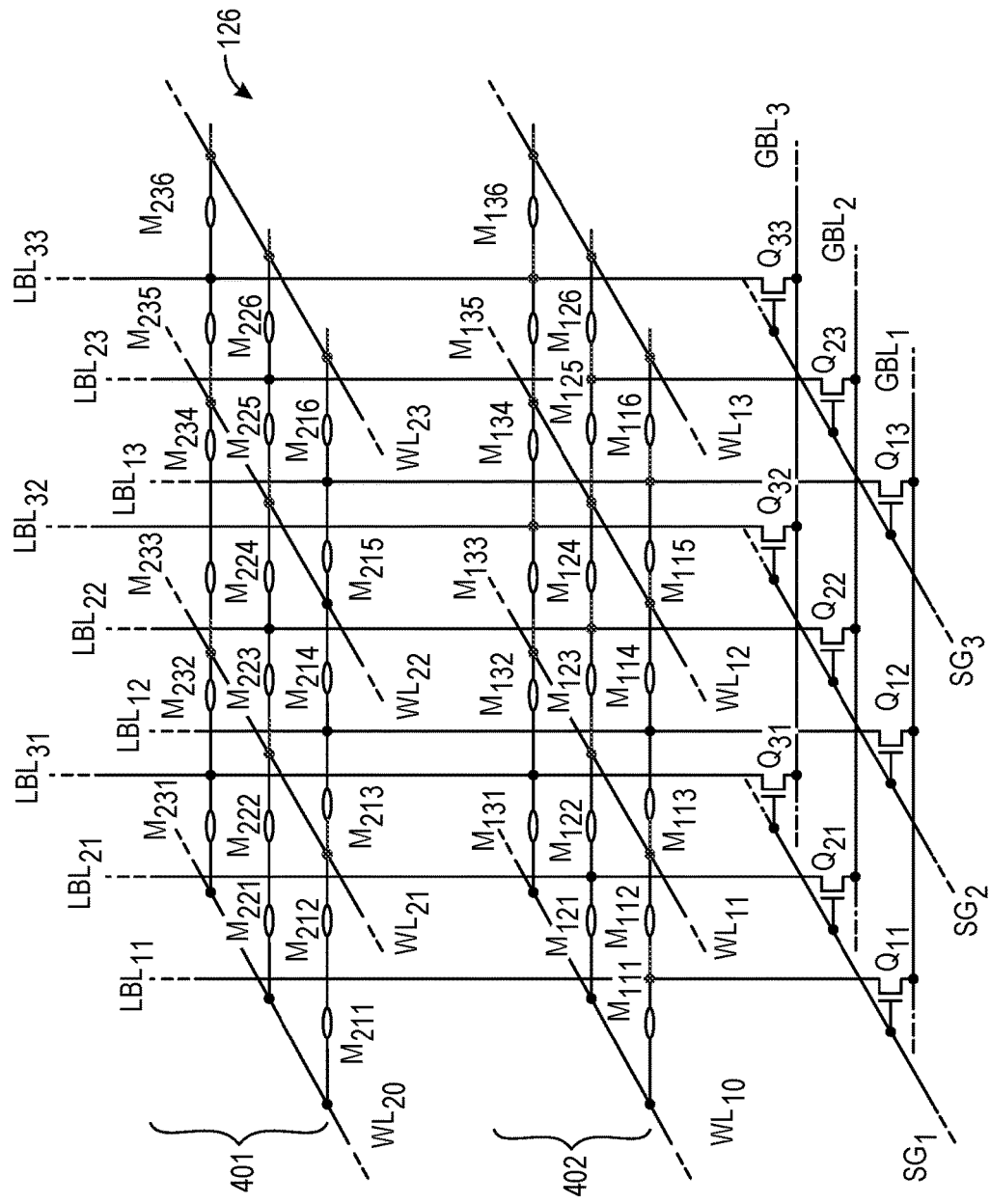
FIG. 4H depicts various embodiments of a portion of a three-dimensional memory array with a vertical cross-point structure, in connection with which, example embodiments of the disclosed technology can be implemented.

FIG. 4G is a schematic of horizontal sub-block HSB0. Horizontal sub-blocks HSB1, HSB2 and HSB3 may have similar structures. FIG. 4G shows physical wordlines WL0-WL95 running across the entire sub-block HSB0. All of the NAND strings of sub-block HSB0 are connected to SGD0 and SGS0. For ease of depiction, FIG. 4G only depicts six NAND strings 501, 502, 503, 504, 505, and 506; however, horizontal sub-block HSB0 may have thousands of NAND strings (e.g., 15,000 or more).

FIG. 4G is being used to explain the concept of a selected memory cell. A memory operation is an operation designed to use the memory for its purpose and includes one or more of reading data, writing/programming data, erasing memory cells, refreshing data in memory cells, and the like. During any given memory operation, a subset of the memory cells will be identified to be subjected to one or more parts of the memory operation. These memory cells identified to be subjected to the memory operation are referred to as selected memory cells. Memory cells that have not been identified to be subjected to the memory operation are referred to as unselected memory cells. Depending on the memory architecture, the memory type, and the memory operation, unselected memory cells may be actively or passively excluded from being subjected to the memory operation.

As an example of selected memory cells and unselected memory cells, during a programming process, the set of memory cells intended to take on a new electrical characteristic (or other characteristic) to reflect a changed programming state are referred to as the selected memory cells, while the memory cells that are not intended to take on a new electrical characteristic (or other characteristic) to reflect a changed programming state are referred to as the unselected memory cells. In certain situations, unselected memory cells may be connected to the same wordline as selected memory cells. Unselected memory cells may also be connected to different wordlines than selected memory cells. Similarly, during a reading process, the set of memory cells to be read are referred to as the selected memory cells, while the memory cells that are not intended to be read are referred to as the unselected memory cells.

To better understand the concept of selected memory cells and unselected memory cells, assume a programming operation is to be performed and, for example purposes only, that wordline WL94 and horizontal sub-block HSB0 are selected for programming (see FIG. 4G). That means that all of the memory cells connected to WL94 that are in horizontal sub-blocks HSB1, HSB2 and HSB3 (the other horizontal sub-blocks) are unselected memory cells. Some of the memory cells connected to WL94 in horizontal sub-block HSB0 are selected memory cells and some of the memory cells connected to WL94 in horizontal sub-block HSB0 are unselected memory cells depending on how the programming operation is performed and the data pattern being programmed. For example, those memory cells that are to remain in the erased state (e.g., state S0) will be unselected memory cells because their programming state will not change in order to store the desired data pattern, while those memory cells that are intended to take on a new electrical characteristic (or other characteristic) to reflect a changed programming state (e.g., programmed to states S1-S7) are selected memory cells. Looking at FIG. 4G, assume for example purposes, that memory cells 511 and 514 (which are connected to wordline WL94) are to remain in the erased state; therefore, memory cells 511 and 514 are unselected memory cells (labeled unsel in FIG. 4G). Additionally, assume, for example purposes, that memory cells 510, 512, 513 and 515 (which are connected to wordline WL94) are each to be programmed to a respective one of data states S1-S7; therefore, memory cells 510, 512, 513 and 515 are selected memory cells (labeled sel in FIG. 4G).

FIG. 4H illustrates another memory structure that can be used for the structure 126 of FIG. 1A. FIG. 4H illustrates a three-dimensional vertical cross-point structure, the wordlines still run horizontally, with the bitlines oriented to run in a vertical direction.

FIG. 4H depicts one embodiment of a portion of a monolithic three-dimensional memory array structure 126 that includes a first memory level 402 positioned below a second memory level 401. As depicted, the local bitlines LBL11-LBL33 are arranged in a first direction (e.g., a vertical direction) and the wordlines WL10-WL23 are arranged in a second direction perpendicular to the first direction. This arrangement of vertical bitlines in a monolithic three-dimensional memory array is one embodiment of a vertical bitline memory array. As depicted, disposed between the intersection of each local bitline and each wordline is a particular memory cell (e.g., memory cell M111 is disposed between local bitline LBL11 and wordline WL10). This structure can be used with a number of different memory cell structures. In one example, the particular memory cell may include a floating gate device or a charge trap device (e.g., using a silicon nitride material). In another example, the particular memory cell may include a reversible resistance-switching material, a metal oxide, a phase change memory (PCM) material, or a ReRAM material. The global bitlines GBL1-GBL3 are arranged in a third direction that is perpendicular to both the first direction and the second direction. A set of bitline select devices (e.g., Q11-Q31), such as a vertical thin film transistor (VTFT), may be used to select a set of local bitlines (e.g., LBL11-

LBL31). As depicted, bitline select devices Q11-Q31 are used to select the local bitlines LBL11-LBL31 and to connect the local bitlines LBL11-LBL31 to the global bitlines GBL1-GBL3 using row select line SG1. Similarly, bitline select devices Q12-Q32 are used to selectively connect the local bitlines LBL12-LBL32 to the global bitlines GBL1-GBL3 using row select line SG2 and bitline select devices Q13-Q33 are used to selectively connect the local bitlines LBL13-LBL33 to the global bitlines GBL1-GBL3 using row select line SG3.

Referring to FIG. 4H, as only a single bitline select device is used per local bitline, only the voltage of a particular global bitline may be applied to a corresponding local bitline. Therefore, when a first set of local bitlines (e.g., LBL11-LBL31) is biased to the global bitlines GBL1-GBL3, the other local bitlines (e.g., LBL12-LBL32 and LBL13-LBL33) must either also be driven to the same global bitlines GBL1-GBL3 or be floated. In one embodiment, during a memory operation, all local bitlines within the memory array are first biased to an unselected bitline voltage by connecting each of the global bitlines to one or more local bitlines. After the local bitlines are biased to the unselected bitline voltage, then only a first set of local bitlines LBL11-LBL31 are biased to one or more selected bitline voltages via the global bitlines GBL1-GBL3, while the other local bitlines (e.g., LBL12-LBL32 and LBL13-LBL33) are floated. The one or more selected bitline voltages may correspond with, for example, one or more read voltages during a read operation or one or more programming voltages during a programming operation.

Figure 5:
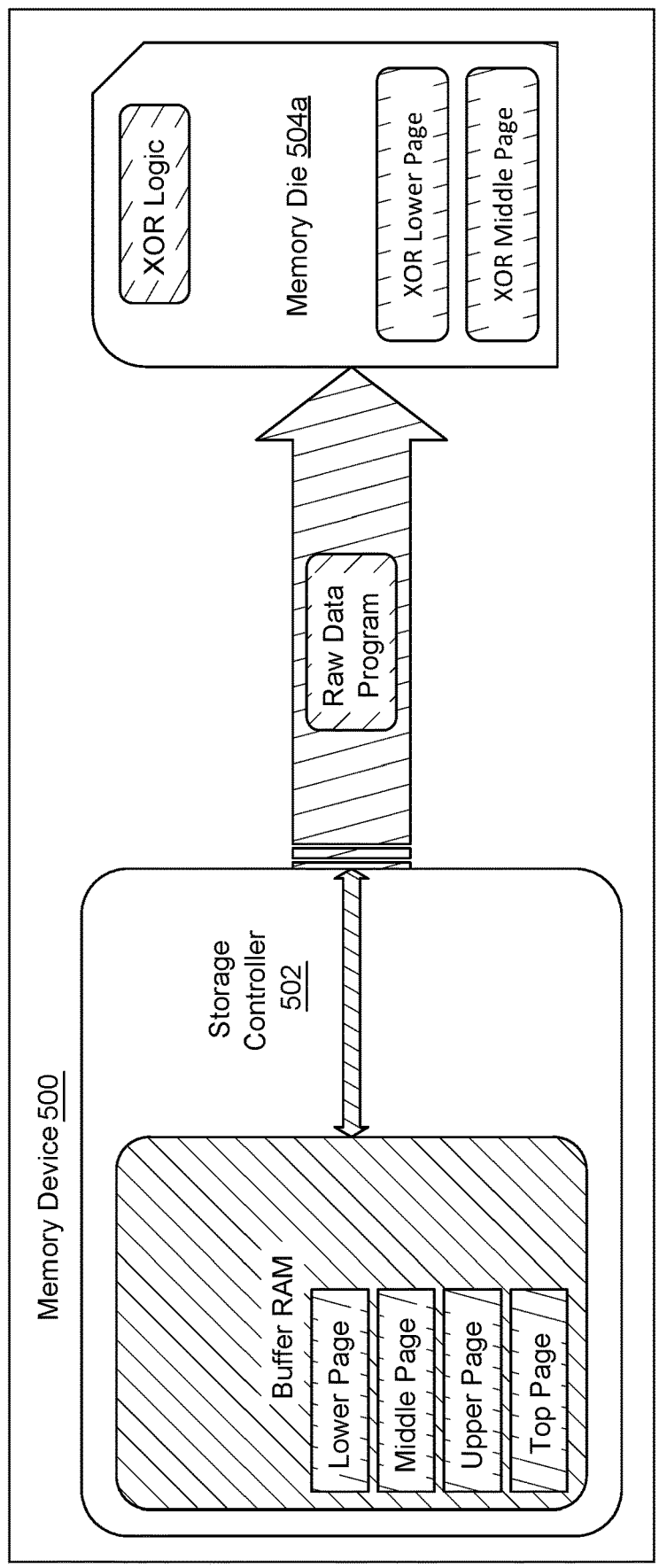
FIG. 5 depicts an example memory device, in accordance with embodiments of the presently disclosed technology.

FIG. 5 depicts an example memory device 500, in accordance with embodiments of the presently disclosed technology. As depicted, memory device 500 includes a storage controller 502 and a memory die 504(*a*). Memory device 500 may be analogous to memory device 200 depicted in the previous FIGS. Relatedly, storage controller 502 may be analogous to storage controller 102, and memory die 504*a* may be analogous to one of memory dies 104*a*-*n* depicted in the previous FIGS. Memory device 500 may be an example of a QLC memory device (i.e., a memory device having constituent non-volatile memory cells that store four-bit levels corresponding with a top data page, an upper data page, a middle data page, and a lower data page).

As depicted, storage controller 502 receives four raw data pages from a host device (e.g., host device 106 from FIG. 1). The four raw data pages may comprise a top raw data page, an upper raw data page, a middle raw data page, and a lower raw data page. As alluded to above, the top raw data page may comprise the most significant bits of the raw data received from the host, the upper raw data page may comprise the second most significant bits of the raw data, the middle raw page may comprise the third most significant bits of the raw data, and the lower raw data page may comprise the least significant bits of the raw data. As depicted, storage controller 502 may store the raw data pages in buffer RAM prior to transmitting the raw data pages to memory die 504*a*.

As alluded to above, when memory die 504*a* receives raw data pages from storage controller 502, memory die 504*a* may write the raw data pages to data latches of memory die 504*a*. For example, memory die 504*a* can write the top raw data page to a top page data latch of a raw data plane of memory die 504*a*. Relatedly, memory die 504*a* can write the upper raw data page to an upper page data latch of the raw data plane, the middle raw data page to a middle page data latch of the raw data plane, and the lower raw data page to a lower page data latch of the raw data plane. When transmitting the raw data pages to memory die 504*a*, storage controller 502 may indicate where (i.e., to which data latches) the raw data pages should be written. In certain implementations, storage controller 502 may provide the raw data pages to the data latches of memory die 504*a* in the arrangement described above.

Upon writing the raw data pages to appropriate data latches of its raw data plane, memory die 504*a* can generate XOR data pages from the raw data pages. As alluded to above, the XOR data pages can be used to recover the raw data pages used to generate the XOR data pages when the raw data pages become corrupted. For example, memory die 504*a* can perform an XOR operation between the top raw data page and the upper raw data page to generate a first XOR data page that can be used to recover the top raw data page and/or the upper raw data page in the event of corruption. Relatedly, memory die 504*a* can perform an XOR operation between the middle raw data page and the lower raw data page to generate a second XOR data page that can be used to recover the middle raw data page and/or the lower raw data page in the event of corruption. As alluded to above, memory die 504 (*a*) may also generate two fixed content data pages (i.e., a first fixed content data page and a second fixed content data page). Memory die 504*a* may then write the XOR data pages and the fixed content data pages to data latches of a back-up data plane of memory die 504*a*. For example, memory die 504*a* can write the first fixed content data page to a top page data latch of the back-up data plane, the first XOR data page to an upper page data latch of the back-up data plane, the second fixed content data page to a middle page data latch of the back-up data plane, and the second XOR data page to a lower page data latch of the back-up data plane.

As alluded to above, the data latches of memory die 504*a* may comprise circuits that temporarily store the raw data pages and back-up data pages (i.e., the XOR data pages and fixed content data pages) prior to and during programming to the non-volatile memory cells of memory die 504*a*. The non-volatile memory cells of memory die 504*a* may be arranged on wordlines of the raw data plane and the back-up data plane. Accordingly, memory die 504*a* can program the raw data pages written to the data latches of the raw data plane to a wordline of the raw data plane for non-volatile memory storage. Likewise, memory die 504*a* can program the back-up data pages written to the data latches of the back-up data plane to a wordline of the back-up data plane for non-volatile memory storage. As alluded to above, a non-volatile memory cell may comprise a transistor that can be programmed to multiple possible states by tuning/programming voltage of the transistor. Accordingly, the process of programming the data pages written to the data latches of memory die 504*a* may comprise converting bits to voltage states that represent the various bits/bit levels.

Figure 6:
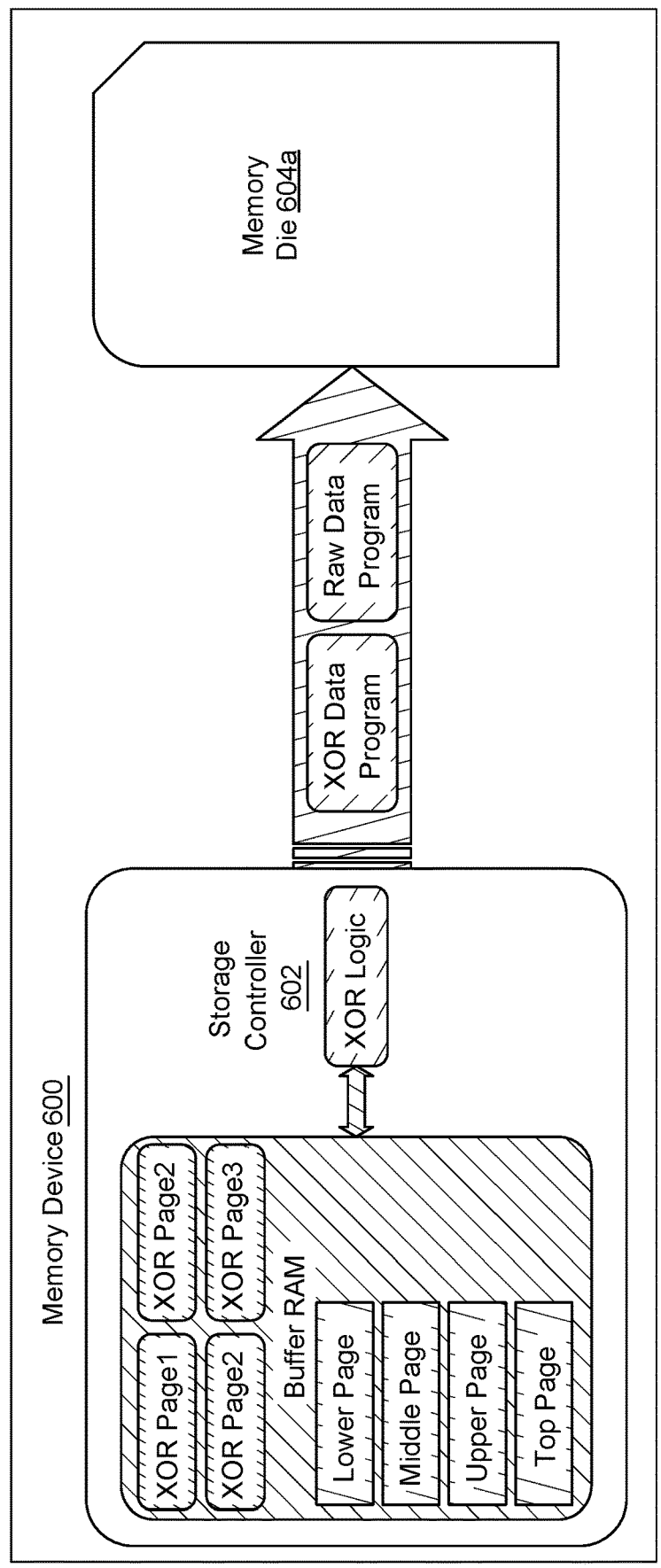
FIG. 6 depicts another example memory device, in accordance with embodiments of the present technology.

FIG. 6 depicts an example memory device 600, in accordance with embodiments of the present technology. As depicted, memory device 600 includes a storage controller 602 and a memory die 604*a*. Here, memory device 600 may be analogous to memory device 500 from FIG. 5. Relatedly, storage controller 602 may be analogous to storage controller 502, and memory die 604*a* may be analogous memory die 504*a* from FIG. 5. Like memory device 500, memory device 600 may be an example of a QLC memory device (i.e., a memory device having constituent non-volatile memory cells that store four-bit levels corresponding with a top data page, an upper data page, a middle data page, and a lower data page).

As depicted, memory device 600 implements a different XOR data page generation/programming methodology than memory device 500. Namely, in memory device 600, storage controller 602 generates XOR data pages and transmits the XOR data pages to memory die 604a. As alluded to above, this methodology has certain disadvantages as compared to the XOR data page generation/programming methodology of memory device 500. For example, the XOR data page generation/programming methodology of memory device 600 involves transmitting more data from storage controller to memory die. Namely, XOR data pages generated by storage controller 602 must be transmitted to memory die 604a along with the raw data pages. This extra data transmission has a time and resource cost, which memory device 500 avoids. Moreover, the XOR data page generation/programming methodology of memory device 600 consumes more buffer RAM space on storage controller 602 as the generated XOR data pages are stored in the buffer RAM space prior to transmission to memory die 604a. By contrast, the XOR data page generation/programming methodology of memory device 500 conserves this storage controller buffer RAM space by natively generating XOR data pages at memory die 504a instead.

Figure 7:
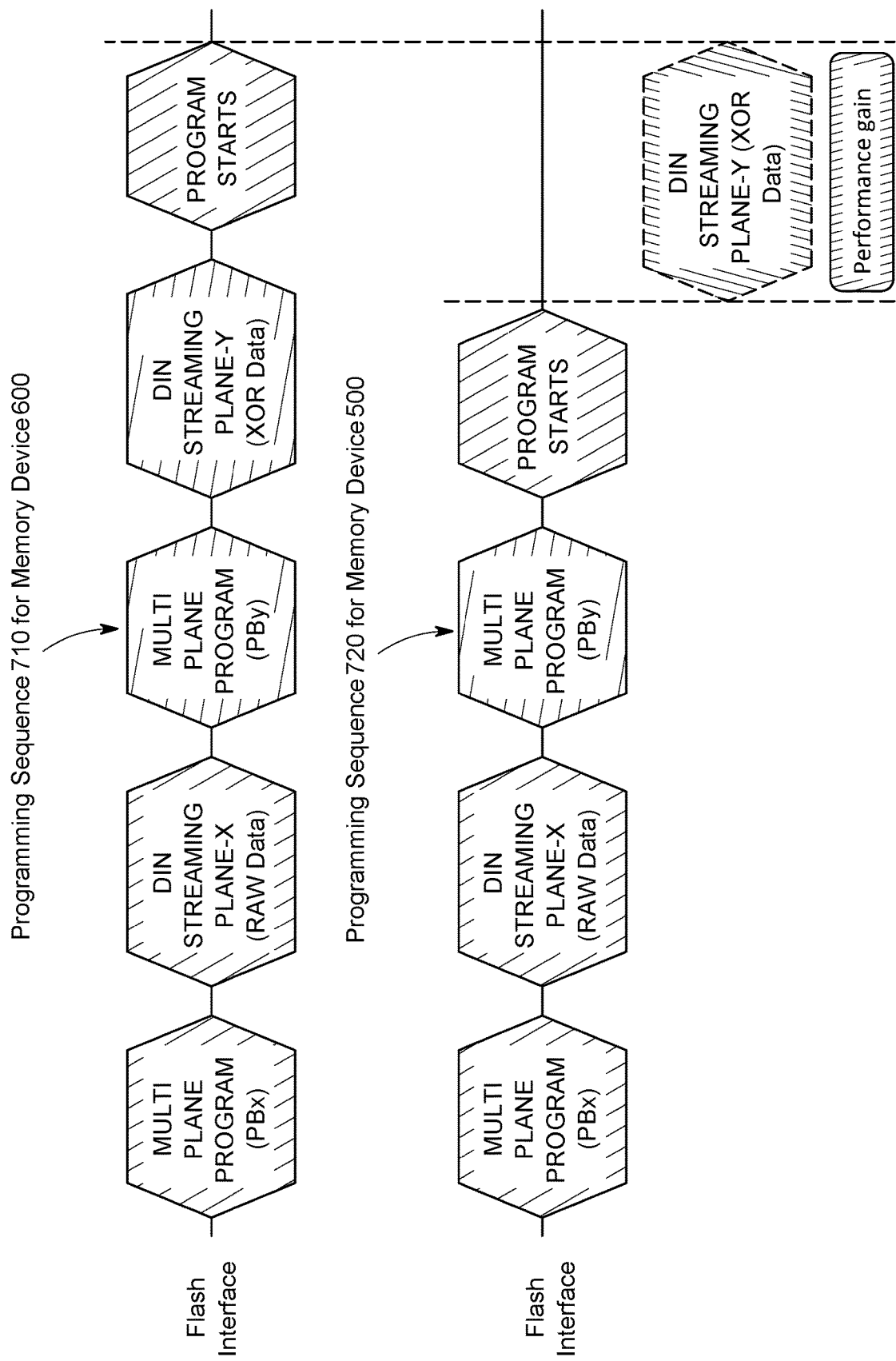
FIG. 7 depicts example programming sequences for memory devices, in accordance with embodiments of the presently disclosed technology.

FIG. 7 depicts example programming sequences for memory devices 600 and 500 respectively, in accordance with embodiments of the presently disclosed technology. Namely, programming sequence 710 illustrates a programming sequence for memory device 600 described in conjunction with FIG. 6. Programming sequence 720 illustrates a programming sequence for memory device 500 described in conjunction with FIG. 5. Here, the functions depicted to the left of the dashed vertical lines are performed by the storage controllers of the respective memory devices. By contrast, functions to the right of the dashed vertical lines are performed by the memory dies (or memory die controllers) of the respective memory devices.

As depicted, programming sequence 720 realizes a performance gain over programming sequence 710 because the memory die of memory device 500 natively generates XOR data pages. Accordingly, data-in (DIN) streaming of XOR data pages into the memory die of memory device 500 is obviated—resulting in overall performance gain. This is because streaming data (e.g., XOR data pages) from the storage controller to the memory die can consume a significant amount of time and resources as compared to the time and resources required to generate the data (e.g., the XOR data pages).

Figure 8:
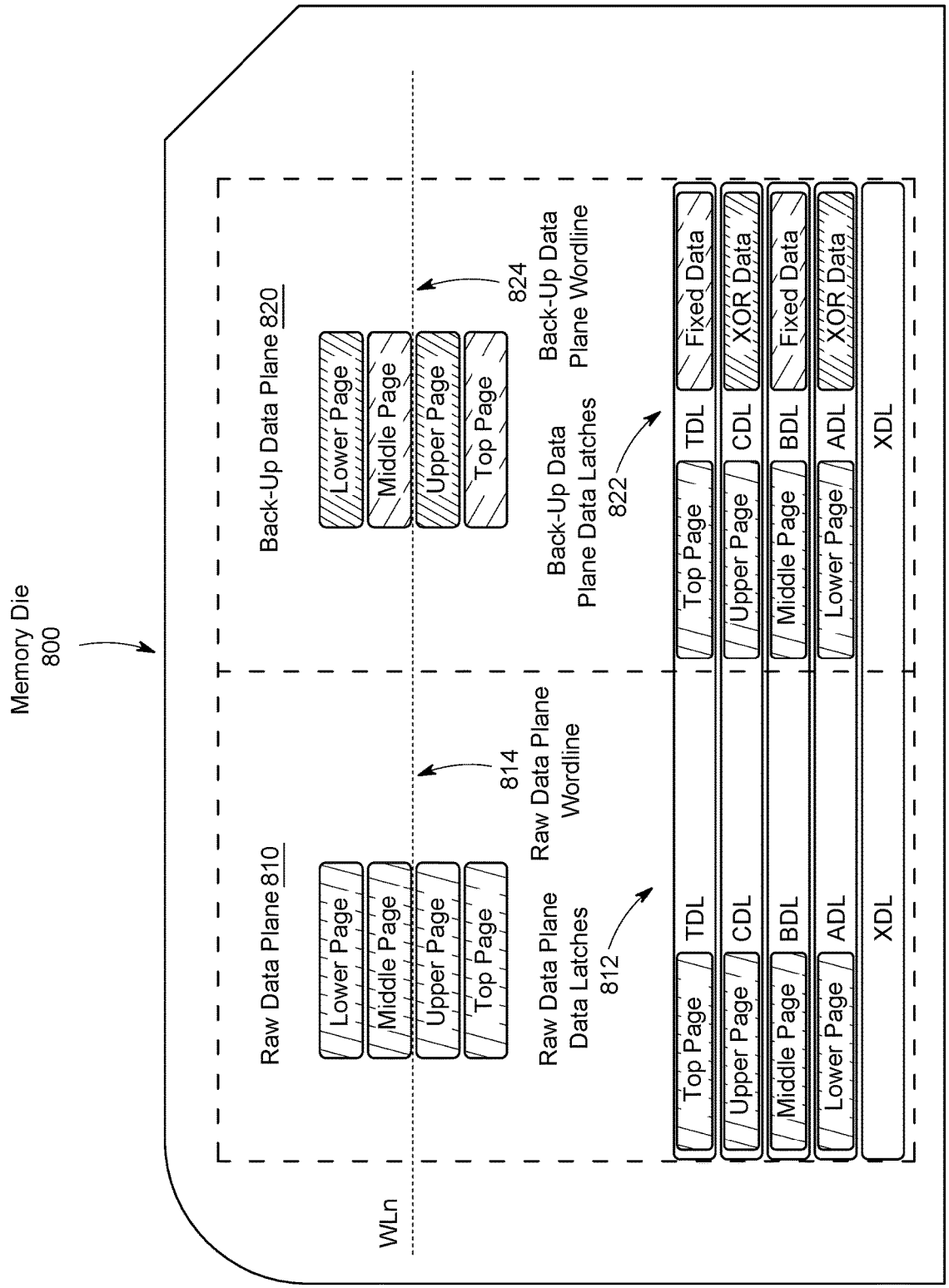
FIG. 8 depicts an example memory die, in accordance with embodiments of the presently disclosed technology.

FIG. 8 depicts an example memory die 800, in accordance with embodiments of the presently disclosed technology. Memory die 800 may be an example of a 2-plane QLC memory die (i.e., a memory die having two physical planes and constituent non-volatile memory cells that store four-bit levels corresponding with a top data page, an upper data page, a middle data page, and a lower data page).

Memory die 800 comprises a raw data plane 810 and a back-up data plane 820. As alluded to above, embodiments can program raw data pages and back-up data pages (i.e., XOR data pages and fixed content data pages) more efficiently by leveraging separate data planes of memory die 800 for raw data pages and back-up data pages respectively. Namely, memory die 800 can store/program raw data pages to raw data plane 810, while storing/programming back-up data pages to back-up data plane 820.

As alluded to above, embodiments can leverage an "all-plane" enable mode that enables data page sharing across physical planes of memory die 800. Such data page sharing enables memory die 800 to generate and store an XOR data page on back-up data plane 820 using raw data pages stored on raw data plane 810. The "all-plane" enable mode can also facilitate simultaneous/parallel data latch operations and programming of raw data pages and back-up data pages on raw data plane 810 and back-up data plane 820 respectively. In this way, the raw data pages and back-up data pages can be programmed to non-volatile memory in a more rapid/efficient manner than if the raw data pages and back-up data pages were programmed/stored on the same physical data plane.

Storing raw data pages and back-up data pages on separate physical data planes of memory die 800 can also reduce a likelihood that a data corruption impacting a raw data page also impacts an XOR data page used to back-up the raw data page. This is because certain error events may be associated with a certain physical region of memory die 800.

As depicted, raw data plane 810 and back-up data plane 820 each comprise their own wordlines and data latches. For example, raw data plane 810 includes a raw data plane wordline 814 and raw data plane-data latches 812. Likewise, back-up data plane 820 includes a back-up data plane wordline 824 and back-up data plane-data latches 822.

As alluded to above, the data latches of memory die 800 may correspond with data pages they are configured to store. For example, a top raw data page may be written to a top page-data latch of raw data plane-data latches 812. Similarly, an upper raw data page may be written to an upper page-data latch of raw data plane-data latches 812, a middle raw data page may be written to a middle page-data latch of raw data plane-data latches 812, and a lower raw data page may be written to a lower page-data latch of raw data plane-data latches 812.

As described above, memory die 800 (or more specifically, a controller of memory die 800) can generate XOR data pages from the raw data pages written to raw data plane-data latches 812. For example, memory die 800 can generate a first XOR data page by performing an XOR operation between the top raw data page and the upper raw data page. Similarly, memory die 800 can generate a second XOR data page by performing an XOR operation between the middle raw data page and the lower raw data page. As depicted, upon generating the first and second XOR data pages, memory die 800 can write the first and second XOR data pages to back-up data plane-data latches 822. For example, as embodiments of the present technology are designed in appreciation of, certain memory dies (e.g., memory die 800) are already capable of performing logical Boolean operations (including an XOR operation) for other purposes. For example, memory die 800 may already perform XOR operations relating to an internal data latch non-volatile memory cell sensing process. Accordingly, embodiments can leverage this existing—and in the context of UECC data page error recovery, currently unutilized—feature of memory die 800 to generate XOR data pages. As another example (and as described above), embodiments can leverage modes of a memory die that enable data page sharing across physical planes of the memory die. For example, data page sharing across physical planes of memory die 800 enables memory die 800 to generate and store an XOR data page on back-up data plane 820 using raw data pages stored on raw data plane 810.

As depicted, memory die 800 can also generate a first fixed content page and a second fixed content data page. Memory die 800 can then write the first fixed content page to a top page-data latch of back-up data plane-data latches 822, and the second fixed content page to a middle page-data latch of back-up data plane-data latches 822.

As alluded to above, the data latches of memory die 800 may comprise circuits that temporarily store the raw data pages and back-up data pages (i.e., the XOR data pages and fixed content data pages) prior to and during programming to the wordlines/non-volatile memory cells of memory die 800. Accordingly, memory die 800 may program the raw data pages written to raw data plane-data latches 812 to raw data plane wordline 814. Likewise, memory die 800 can program the back-up data pages written to back-up data plane-data latches 822 to back-up data plane wordline 824. As alluded to above, a non-volatile memory cell may comprise a transistor that can be programmed to multiple possible states by tuning/programming voltage of the transistor. Accordingly, the process of programming the data pages written to the data latches of memory die 800 to the wordlines/non-volatile memory cells of memory die 800 may comprise converting bits to voltage states that represent the various bits/bit levels.

As described above, memory die 800 can leverage an "all-plane" enable mode that facilitates simultaneous programming of raw data pages and back-up data pages (e.g., XOR data pages and/or fixed data pages) on raw data plane 810 and back-up data plane 820 respectively. In this way, the raw data pages and back-up data pages can be programmed to non-volatile memory in a more rapid/efficient manner than if the raw data pages and back-up data pages were programmed/stored on the same physical data plane.

As alluded to above, the naming conventions for raw data plane 810 and back-up data plane 820 are merely used for clarity in the text of this application. Accordingly, any data plane of memory die 800 (e.g., raw data plane 810 and back-up data plane 820) may store raw data pages or back-up data pages (i.e., XOR data pages and fixed content data pages) based on programming method requirements at various times.

Figure 9A:
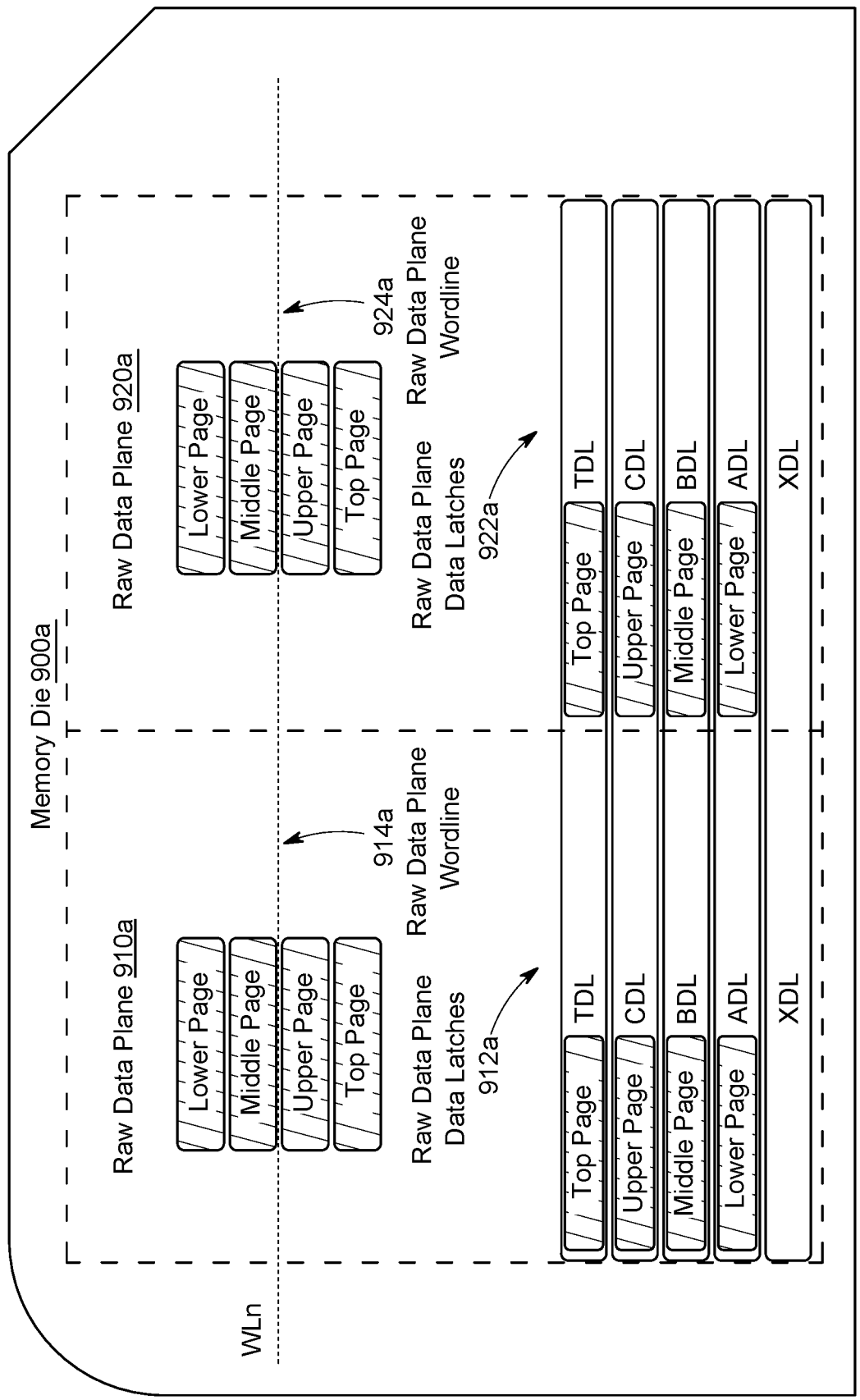
FIGS. 9A and 9B depict example memory dies, in accordance with embodiments of the presently disclosed technology.
Figure 9B:
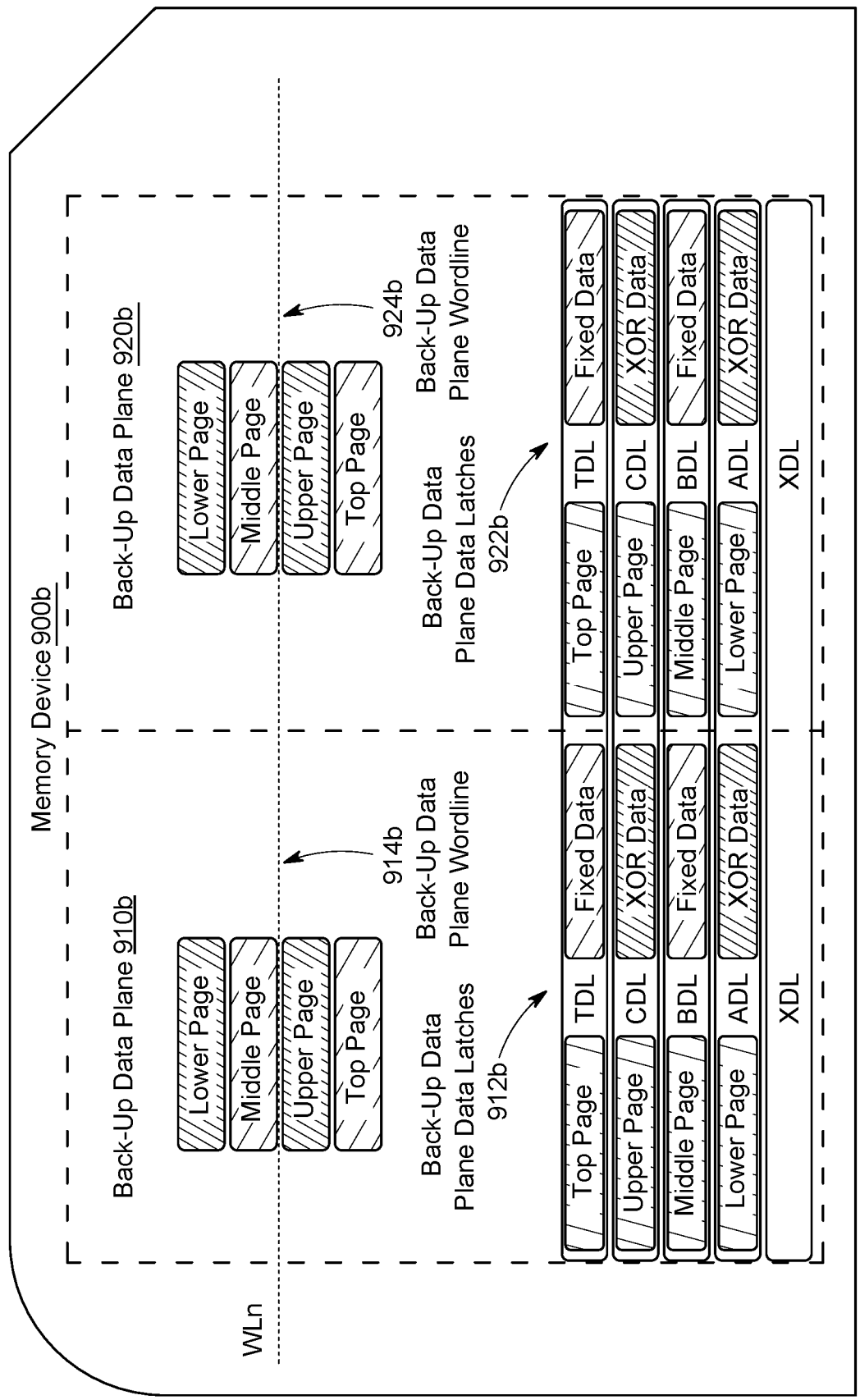

FIGS. 9A and 9B depict memory dies 900a and 900b respectively, in accordance with embodiments of the presently disclosed technology.

As alluded to above, embodiments can also improve programming efficiency and data storage reliability by storing raw data pages and back-up data pages on separate memory die of a common memory package (as used herein, a memory package refers to a group of memory dies of a non-volatile memory device that share a common interface). Storing the raw data pages and back-up data pages on separate memory dies of can also reduce a likelihood that a data corruption impacting a raw data page also impacts an XOR data page used to back-up the raw data page. Again, this is because certain error events may be associated with a certain physical region of a non-volatile memory device.

Accordingly, memory dies 900a and 900b may be examples of two memory dies that belong to a common memory package. The memory package may comprise a group of memory dies—including memory dies 900a and 900b—that can access a common interface. This shared interface access enables data page sharing across memory dies 900a and 900b. As will be described below, such data page sharing enables memory die 900b to generate and store an XOR data page using raw data pages stored on memory die 900a. The shared interface can also facilitate simultaneous/parallel data latch operations and programming of raw data pages and back-up data pages across memory dies 900a and 900b (such parallel operation is sometimes referred to herein as an "all-die" enable mode). In this way, the raw data pages and back-up data pages can be programmed to non-volatile memory in a more rapid/efficient manner than if the raw data pages and back-up data pages were programmed/stored on the same physical memory die.

Like memory die 800, memory dies 900a and 900b may be examples of 2-plane QLC memory dies (i.e., memory dies having two physical planes and constituent non-volatile memory cells that store four-bit levels corresponding with a top data page, an upper data page, a middle data page, and a lower data page). Accordingly, memory dies 900a and 900B may have the same/similar configuration as memory die 800, except instead of comprising one raw data plane and one back-up data plane, memory dies 900a and 900b comprise two raw data planes and two back-up data planes respectively. Thus, memory die 900a may be referred to as a "raw data memory die" and memory die 900b may be referred to as a "back-up data memory die."

Here, raw data plane 910a of memory die 900a may correspond with back-up data plane 910b of memory die 900b. For example, memory die 900b may generate a first XOR data page by performing an XOR operation between a top raw data page and an upper raw data page of raw data plane 910a. This first XOR data page may be stored on back-up data plane 910b and may be used to recover the top raw data page and/or upper raw data page of raw data plane 910a. Similarly, memory die 900b may generate a second XOR data page by performing an XOR operation between a middle raw data page and a lower raw data page of raw data plane 910a. This second XOR data page may be stored on back-up data plane 910b and may be used to recover the middle raw data page and/or lower raw data page of raw data plane 910a.

Raw data plane 920a of memory die 900a may likewise correspond with back-up data plane 920b of memory die 900b. For example, memory die 900b may generate a third XOR data page by performing an XOR operation between a top raw data page and an upper raw data page of raw data plane 920a. This third XOR data page may be stored on back-up data plane 920b and may be used to recover the top raw data page and/or upper raw data page of raw data plane 920a. Similarly, memory die 900b may generate a fourth XOR data page by performing an XOR operation between a middle raw data page and a lower raw data page of raw data plane 920a. This fourth XOR data page may be stored on back-up data plane 920b and may be used to recover the middle raw data page and/or lower raw data page of raw data plane 920a.

As alluded to above, by leveraging separate memory die for raw data storage and back-up data storage embodiments, can improve reliability. For example, a local corruption on memory die 900a is less likely to impact the back-up data stored on the memory die 900b.

FIG. 10 depicts an example non-volatile memory cell state encoding table 1000, in accordance with embodiments of the present technology.

Non-volatile memory cell state encoding table 1000 illustrates bit-wise representations for possible states that can programmed to a non-volatile memory cell of a back-up data plane. As alluded to above, when a non-volatile memory cell comprises a QLC, the non-volatile memory cell/QLC can generally be programmed to 16 possible states (e.g., states S0-S15). Where a QLC comprises a transistor, the QLC may be programmed to the 16 possible states by tuning/programming voltage of the transistor. Accordingly, the process of programming data pages written to data latches of a memory die may comprise converting bits to voltage states that represent the various bits/bit levels of the data pages.

As depicted in non-volatile memory cell state encoding table 1000, a first fixed content data page may be written to a top page-data latch of a back-up data plane of a QLC memory die. Relatedly, a first XOR data page may be written to an upper page-data latch of the back-up data plane, a second fixed content data page may be written to a middle page-data latch of the back-up data plane, and a second XOR data page may be written to a lower page-data latch of the back-up data plane. As alluded to above, the first fixed content data page may comprise the most significant bits of the back-up data stored on the back-up data plane, the first XOR data page may comprise the second most significant bits of the data, the second fixed content data page may comprise the third most significant bits of the data, and the second XOR data page may comprise the least significant bits of the data. In other implementations the above-described bit/page arrangement may be different. For example, the lower data page may comprise the most significant bits of the data, and the top data page may comprise the least significant bits of the data, etc.

As alluded to above, generation and programming of fixed content data pages can improve reliability for back-up data storage. This is because the QLC memory die is configured/optimized for four-bit programming. As alluded to above, XOR operations effectively compress four raw data pages (storing four bits per non-volatile memory cell) into two XOR data pages (storing two bits per non-volatile memory cell). Accordingly, without the first and second fixed content data pages, the QLC memory die would only have two data pages/two bits to program to a wordline of the back-up data plane, which can reduce performance/reliability. The first and second fixed content data pages may comprise known/fixed values (e.g., ones or zeroes) that do not change based on the values of the above-described raw data pages and/or XOR data pages.

As alluded to above, embodiments can further improve reliability through strategic/intelligent selection of values for the fixed content data pages. For example, by selecting values for fixed content data pages that are either all zeroes or all ones, embodiments can reduce the number of possible states that non-volatile memory cells of a back-up data plane wordline can be programmed to. For example, and as depicted in non-volatile memory cell state encoding table 1000, the values of the first and second fixed content data pages can be set to be all ones. In doing so, the number of possible programming states for the back-up data plane wordline can be reduced from 16 to four. In other words, if the values of the first and second fixed content data pages are all ones, the QLCs of the back-up data plane can only be programmed to states S0, S1, S8, and S15. Again, this is because the most significant bit values (associated with the first fixed content data page) and the third most significant bit values (associated with the second fixed content data page) are being restricted to ones. By reducing the number of possible programming states for the QLCs of the back-up data plane to four, embodiments can utilize wider voltage spacing between possible programming states. In other words, there can be a larger voltage spacing between S1 and S8 than between S1 and S2. Similarly, there can be a larger voltage spacing between S8 and S15 than between S8 and S9. By using wider voltage spacing between possible programming states on the back-up data plane, embodiments can reduce the likelihood of error events on the back-up data plane as many error events are associated with fine/close voltage spacing between adjacent programming states. In this way, embodiments can ensure that the back-up data stored on the back-up data plane is less likely to be corrupted.

Figure 11:
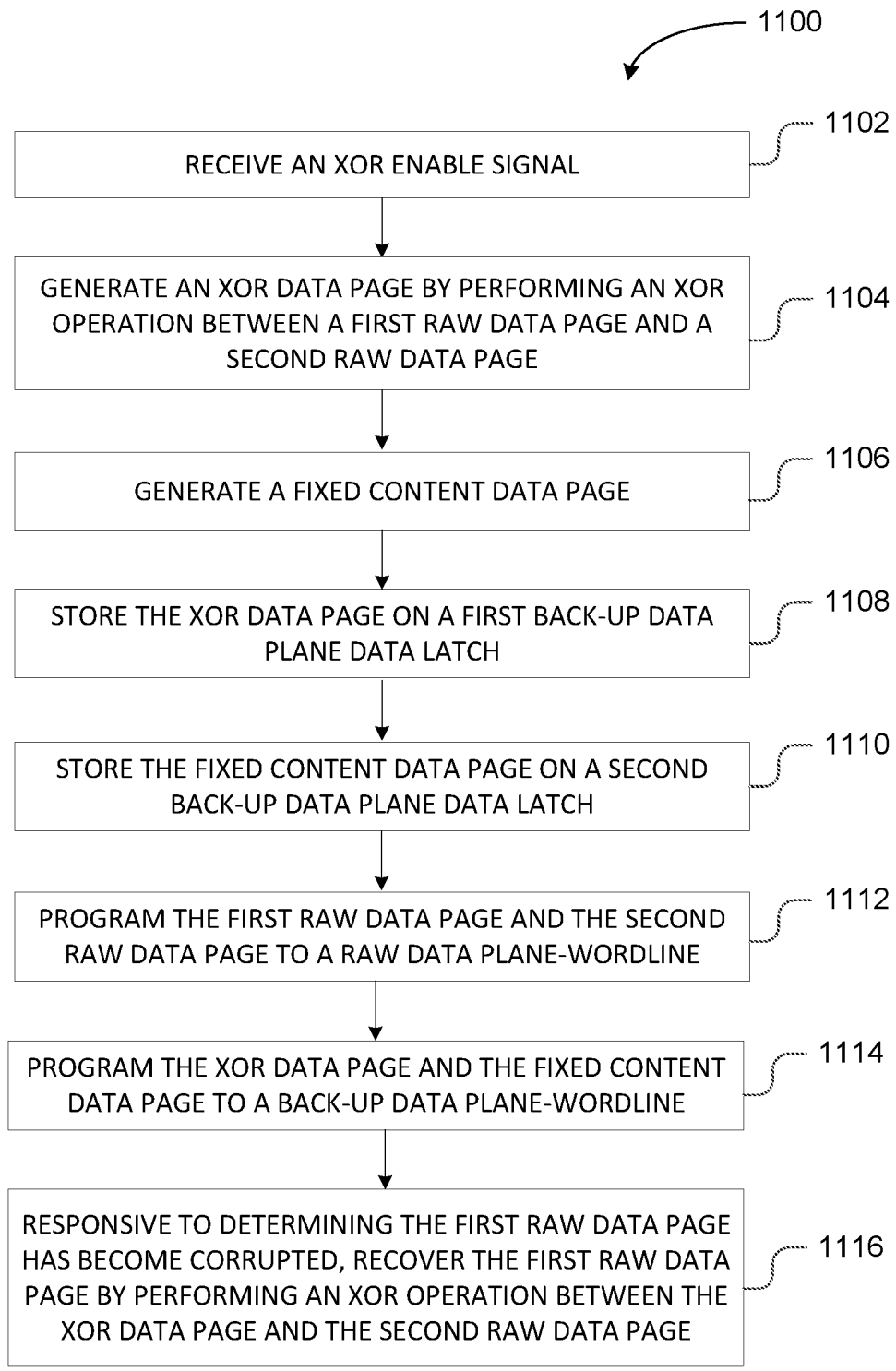
FIG. 11 depicts an example process for memory-die native generation and storage of XOR data pages for corrupted data page recovery, in accordance with embodiments of the present technology.

FIG. 11 depicts an example process 1100 for memory die native-generation and storage of XOR data pages for corrupted data page recovery, in accordance with embodiments of the present technology. As depicted, example process 1100 includes instructions 1102-1116. Instructions 1102-1116 may be executed by a controller of a memory die (i.e., a memory die controller) —such as die controller 204 described in conjunction with FIG. 2A.

For example, the memory die controller can execute instruction 1102 to receive an XOR enable signal. The XOR enable signal may be a signal that instructs the memory die controller to generate one or more XOR data pages for corrupted data page recovery. The XOR enable signal may be received from a storage controller of a memory device on which the memory die is implemented.

Responsive to receiving the XOR enable signal, the memory die controller can execute instruction 1104 to generate an XOR data page by performing an XOR operation between a first raw data page and a second raw data page. As alluded to above, the memory die may comprise a raw data plane and a back-up data plane. A first raw data plane-data latch of the raw data plane may store the first raw data page. A second raw data plane-data latch of the raw data plane may store the second raw data page.

The memory die controller can execute instruction 1106 to generate a fixed content data page. The fixed content data page may be generated based on a state encoding scheme utilized for programming non-volatile memory cells of the memory die. As described above, values of the fixed content data page may comprise all ones or all zeroes. With such value selection, the number of possible programming states for non-volatile memory cells of the back-up data plane may be reduced, thereby improving reliability for the back-up data being stored on the back-up data plane.

The memory die controller can execute instruction 1108 to store the XOR data page on a first back-up plane-data latch of the back-up data plane.

The memory die controller can execute instruction 1110 to store the fixed content data page on a second back-up plane-data latch of the back-up data plane.

The memory die controller can execute instruction 1112 to program the first raw data page and the second raw data page to a wordline of the raw data plane.

The memory die controller can execute instruction 1114 to program the XOR data page and the second raw data page to a wordline of the back-up data plane In various examples, the memory die controller can leverage an "all-plane" enable mode that enables the programming of instructions 1112-1114 to be performed simultaneously/in parallel.

The memory die controller can execute instruction 1116 to, responsive to determining the first raw data page has become corrupted, recover the first data page by performing an XOR operation between the second raw data page and the XOR data page.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (Saas). The processes and algorithms may be implemented partially or wholly in application-specific circuitry. The various features and processes described above may be used independently of one another or may be combined in various ways.

Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALS, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A memory die comprising:
a controller operative to:
generate an exclusive OR (XOR) data page by performing an XOR operation between a first raw data page and a second raw data page,
generate a fixed content data page,
store the XOR data page on a first back-up data plane-data latch, and
store the fixed content data page on a second back-up data plane-data latch;
a raw data plane comprising:
a first raw data plane-data latch that stores the first raw data page, and
a second raw data plane-data latch that stores the second raw data page; and
a back-up data plane comprising:
the first back-up data plane-data latch that stores the XOR data page, and
the second back-up data plane-data latch that stores the fixed content data page.

2. The memory die of claim 1, wherein generating the XOR data page is responsive to receiving an XOR enable signal.

3. The memory die of claim 1, wherein:
the first raw data plane-data latch comprises a first lower page data latch;
the second raw data plane-data latch comprises a first middle page data latch;
the first back-up data plane-data latch comprises a second lower page data latch; and
the second back-up data plane-data latch comprises a second middle page data latch.

4. The memory die of claim 1, wherein:
the controller is further operative to:
generate a second XOR data page data page by performing an XOR operation between a third raw data page and a fourth raw data page,
generate a second fixed content data page,
store the second XOR data page on a third back-up data plane-data latch, and
store the second fixed content data page on a fourth back-up data plane-data latch;
the raw data plane further comprises:
a third raw data plane-data latch that stores the third raw data page, and
a fourth raw data plane-data latch that stores the fourth raw data page; and
the back-up data plane further comprises:
the third back-up data plane-data latch that stores the second XOR data page, and
the fourth back-up data plane-data latch that stores the second fixed content data page.

5. The memory die of claim 1, wherein values of the fixed content data page comprise all ones or all zeroes.

6. The memory die of claim 1, wherein the controller is further operative to:
program the first and second raw data pages to a wordline of the raw data plane; and
program the XOR data page and the fixed content data page to a wordline of the back-up data plane.

7. The memory die of claim 6, wherein the programming to the raw data plane and the back-up data plane is performed in parallel.

8. The memory die of claim 7, wherein the controller is further operative to:
responsive to determining the first raw data page has become corrupted, recover the first raw data page by performing an XOR operation between the second raw data page and the XOR data page.

9. A memory device comprising:
a first memory die comprising:
a controller operative to:
generate a first exclusive OR (XOR) data page by performing an XOR operation between a first raw data page and a second raw data page, generate a second XOR data page by performing an XOR operation between a third raw data page and a fourth raw data page, generate a first fixed content data page and a second fixed content data page, store the first XOR data page on a first back-up data plane-data latch, store the first fixed content data page on a second back-up data plane-data latch, store the second XOR data page on a third back-up data plane-data latch, and store the second fixed content data page on a fourth back-up data plane-data latch;

a first back-up data plane comprising:

the first back-up data plane-data latch that stores the first XOR data page, and the second back-up data plane-data latch that stores the first fixed content data page; and a second back-up data plane comprising:

the third back-up data plane-data latch that stores the second XOR data page, and the fourth back-up data plane-data latch that stores the second fixed content data page.

10. The memory device of claim 9, further comprising:
a second memory die comprising:

a first raw data plane comprising:

a first raw data plane-data latch that stores the first raw data page, and a second raw data plane-data latch that stores the second raw data page, and a second raw data plane comprising:

a third raw data plane-data latch that stores the third raw data page, and a fourth raw data plane-data latch that stores the fourth raw data page.

11. The memory device of claim 10, wherein:
the first raw data plane-data latch comprises a first lower page data latch;
the second raw data plane-data latch comprises a first middle page data latch;
the third raw data plane-data latch comprises a second lower page data latch;
the fourth raw data plane-data latch comprises a second middle page data latch;
the first back-up data plane-data latch comprises a third lower page data latch; the second back-up data plane-data latch comprises a third middle page data latch;
the third back-up data plane-data latch comprises a fourth lower page data latch; and the fourth back-up data plane-data latch comprises a fourth middle page data latch.

12. The memory device of claim 9, wherein values of the first and second fixed content data pages comprise all ones or all zeroes.

13. The memory device of claim 10, wherein the second memory die further comprises a controller operative to:
program the first and second raw data pages to a wordline of the first raw data plane; and
program the third and fourth raw data pages to a wordline of the second raw data plane.

14. The memory device of claim 13, wherein the controller of the first memory die is further operative to:
program the first XOR data page and the first fixed content data page to a wordline of the first back-up data plane; and program the second XOR data page and the second fixed content data page to a wordline of the second back-up data plane.

15. The memory device of claim 14, wherein the controller of the second memory die is further operative to:
responsive to determining the first raw data page has become corrupted, recover the first raw data page by performing an XOR operation between the second raw data page and the first XOR data page.

16. A method performed by a controller on a memory die, the method comprising:
receiving an exclusive OR (XOR) enable signal;
responsive to receiving the XOR enable signal, generating an XOR data page by performing an XOR operation between a first raw data page and a second raw data page;
generating a fixed content data page;
storing the XOR data page on a first back-up data plane-data latch of the memory die; and
storing the fixed content data page on a second back-up data plane-data latch of the memory die.

17. The method of claim 16, further comprising: responsive to determining the first raw data page has become corrupted, recover the first raw data page by performing an XOR operation between the second raw data page and the XOR data page.

18. The method of claim 16, further comprising, in parallel:
programming the first and second raw data pages to a wordline of a raw data plane of the memory die; and
programming the XOR data page and the fixed content data page to a wordline of a back-up data plane of the memory die.

19. The method of claim 18, further comprising:
responsive to receiving the XOR enable signal, generating a second XOR data page by performing an XOR operation between a third raw data page and a fourth raw data page;
generating a second fixed content data page;
storing the second XOR data page on a third back-up data plane-data latch of the memory die; and
storing the second fixed content data page on a fourth back-up data plane-data latch of the memory die.

20. The method of claim 19, further comprising, in parallel: programming the third and fourth raw data pages to a wordline of the raw data plane; and programming the second XOR data page and the second fixed content data page to a wordline of the back-up data plane.

* * * * *